US011552942B2

(12) United States Patent
Wilson et al.

(10) Patent No.: US 11,552,942 B2
(45) Date of Patent: Jan. 10, 2023

(54) USING SOUND TO VERIFY LOCATION

(71) Applicant: International Business Machines Corporation, Armonk, NY (US)

(72) Inventors: Kimiko Wilson, South Melbourne (AU); Jorge Andres Moros Ortiz, Melbourne (AU); Lenin Mehedy, Doncaster East (AU); John Wagner, Carlton (AU)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 16/998,698

(22) Filed: Aug. 20, 2020

(65) Prior Publication Data

US 2022/0060471 A1    Feb. 24, 2022

(51) Int. Cl.
*H04L 9/40* (2022.01)
*G01S 1/72* (2006.01)
(Continued)

(52) U.S. Cl.
CPC .......... *H04L 63/0853* (2013.01); *G01S 1/725* (2013.01); *G10L 25/51* (2013.01); *H04R 3/00* (2013.01)

(58) Field of Classification Search
CPC ....... H04L 63/0853; G01S 1/725; G01S 5/18; G10L 25/51; H04R 3/00; H04R 3/005; H04W 12/06; H04W 12/63; H04W 12/65
See application file for complete search history.

(56) References Cited

U.S. PATENT DOCUMENTS 7,765,166 B2    7/2010  Beringer et al.
8,751,427 B1    6/2014  Mysen et al.
(Continued)

FOREIGN PATENT DOCUMENTS

CN    105093229 A  * 11/2015    ............... G01S 5/18

OTHER PUBLICATIONS

Johnston et al., "Think GPS Offers High Security? Think Again.", Business Contingency Planning Conference, Las Vegas, Nevada, May 23-27, 2004, 24 pages.
(Continued)

*Primary Examiner* — Daniel Pihulic
(74) *Attorney, Agent, or Firm* — Edward J. Wixted, III

(57) ABSTRACT

Method, apparatus, and computer program product are provided for verifying location using sound. In some embodiments, location data representing an unverified location of a first electronic device are received. Audio data generated based on sound detected by a sensor of the first electronic device during a predetermined time are received, as well as audio data generated based on trusted sound detected by a sensor of a second electronic device during the predetermined time, wherein the second electronic device is located near the unverified location of the first electronic device, and wherein the trusted sound includes one or more frequencies inaudible to humans (e.g., infrasonic and/or ultrasonic sound). The audio data generated by the first and second electronic devices are analyzed and a similarity score representing a similarity between the respective audio data is generated. The unverified location of the first electronic device may be verified based on the similarity score.

20 Claims, 12 Drawing Sheets

(51) Int. Cl.
*H04R 3/00* (2006.01)
*G10L 25/51* (2013.01)

(56) References Cited

U.S. PATENT DOCUMENTS

| | | | |
|---|---|---|---|
| 9,148,742 | B1 | 9/2015 | Koulomzin et al. |
| 9,510,118 | B2 | 11/2016 | Eckl |
| 9,813,875 | B2 | 11/2017 | Ceker et al. |
| 11,074,351 | B2* | 7/2021 | Hampton ............... G06F 21/602 |
| 2013/0111208 | A1 | 5/2013 | Sabin et al. |
| 2013/0167208 | A1 | 6/2013 | Shi |
| 2014/0070946 | A1 | 3/2014 | Ambrefe, Jr. |
| 2014/0372160 | A1 | 12/2014 | Nath et al. |
| 2016/0352860 | A1 | 12/2016 | Deb et al. |
| 2018/0198535 | A1* | 7/2018 | Cirit ............... H04M 1/72454 |
| 2019/0041223 | A1 | 2/2019 | Yang et al. |
| 2019/0122691 | A1 | 4/2019 | Roy et al. |
| 2019/0327003 | A1* | 10/2019 | Cirit ................. H04M 1/72454 |
| 2020/0065499 | A1* | 2/2020 | Hampton ............. H04L 9/0872 |
| 2021/0160693 | A1* | 5/2021 | Irvin ..................... G06T 11/001 |
| 2022/0060471 | A1* | 2/2022 | Wilson .................... G01S 5/18 |

OTHER PUBLICATIONS

Hambling, David, "Ships fooled in GPS spoofing attack suggest Russian cyberweapon", NewScientist, Aug. 10, 2017, 6 pages.

Josef et al., "Ultrasonic Key Recognition: Security Algorithm for Pre-composed High Frequency Sound as a Mode of Unlocking a Security Lock", 2012 IEEE/ACIS 11th International Conference on Computer and Information Science, 2012, pp. 655-660 (Abstract only).

Mell et al., "The NIST Definition of Cloud Computing", National Institute of Standards and Technology, NIST Special Publication 800-145, Sep. 2011, 7 pages.

\* cited by examiner

USING SOUND TO VERIFY LOCATION

BACKGROUND

The present invention relates in general to the field of authentication. More particularly, the present invention relates to using sound to verify location.

SUMMARY

Embodiments of the present disclosure include a method, apparatus, and computer program product for verifying location using sound. In some embodiments, location data representing an unverified location of a first electronic device are received. Audio data generated based on sound detected by a sensor of the first electronic device during a predetermined time are received, as well as audio data generated based on trusted sound detected by a sensor of a second electronic device during the predetermined time, wherein the second electronic device is located near the unverified location of the first electronic device, and wherein the trusted sound includes one or more frequencies inaudible to humans (e.g., infrasonic and/or ultrasonic sound). The audio data generated by the first and second electronic devices are analyzed and a similarity score representing a similarity between the respective audio data is generated. The unverified location of the first electronic device may be verified based on the similarity score.

BRIEF DESCRIPTION OF THE SEVERAL VIEWS OF THE DRAWINGS

Embodiments will hereinafter be described in conjunction with the appended drawings, where like designations denote like elements.

DETAILED DESCRIPTION

Figure 1:
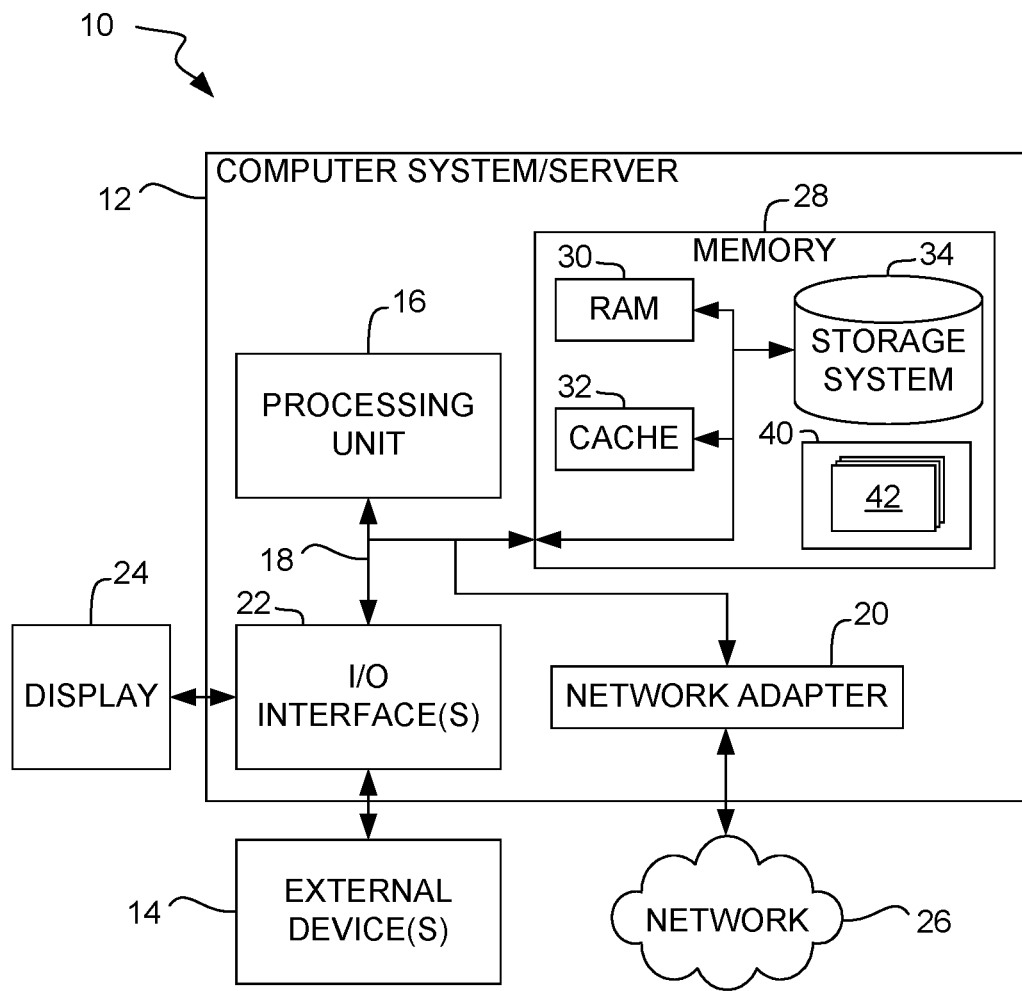
FIG. 1 depicts a cloud computing node, according to one or more embodiments.

One form of digital security relies on verifying the physical location of the user of an electronic device (e.g., a mobile electronic device such as a cell phone) at a specific time. This approach typically relies upon the user enabling GPS location services on the mobile electronic device, and giving permission for the device's GPS data feed to be used in this manner. There are, unfortunately, a couple key issues with this approach. First, GPS data can be spoofed and, therefore, cannot be considered reliable for purposes verifying physical location. Second, users may give away more access to their location and GPS data than they are comfortable with, potentially without the user being explicitly asked for permission when their location and GPS data are used.

As used herein, the term "user" may refer to a natural person (i.e., a human being) or some other entity (e.g., a legal person, artificial intelligence, etc.).

In accordance with some embodiments, a method, apparatus, and computer program product are provided for verifying location using sound. In some embodiments, location data representing an unverified location of a first electronic device are received. Audio data generated based on sound detected by a sensor of the first electronic device during a predetermined time are received, as well as audio data generated based on trusted sound detected by a sensor of a second electronic device during the predetermined time, wherein the second electronic device is located near the unverified location of the first electronic device, and wherein the trusted sound includes one or more frequencies inaudible to humans (e.g., infrasonic and/or ultrasonic sound). Generally, infrasonic sound is below 20 Hz and ultrasonic sound is above 20,000 Hz. The audio data generated by the first and second electronic devices are analyzed and a similarity score representing a similarity between the respective audio data is generated. The unverified location of the first electronic device may be verified based on the similarity score.

In some embodiments, "just-in-time recorded sound" is utilized as a unique identifier to verify a user's location at a specific time. In some embodiments, verification of the user's location may be achieved by means of high frequency sound generated by one or more transducers (e.g., speakers) controlled by a server system. For example, the server system may cause the high frequency sound to be generated at an unverified location of the user's electronic device at a predetermined time. Audio data uploaded to the server system from the user's electronic device based on sound recorded at a predetermined time can be used to obtain a signature that is compared against the signature obtained from other audio data uploaded to the server system from each of one or more other electronic devices located near the unverified location of the user's electronic device based on sound (e.g., in social media) recorded there at the predetermined time to verify the user's location and, by extension, authenticate the user. The signature may, for example, comprise one or more audio fingerprints generated from the uploaded audio data.

In cases in which the user's electronic device is actually located at the unverified location, the signature obtained from the uploaded audio data generated from the sound recorded at the predetermined time by the user's electronic device would compare favorably against the signature obtained from the uploaded audio data generated from the sound recorded at the predetermined time by each of the one or more other electronic devices. In such cases, the high frequency sound would be included both in the sound recorded at the predetermined time by the user's electronic device and in the sound recorded at the predetermined time by each of the one or more other electronic devices.

In other cases in which the user's electronic device is not actually located at the unverified location (e.g., the location of the user's electronic device is being 'spoofed'), the signature obtained from the uploaded audio data generated from the sound recorded at the predetermined time by the user's electronic device would not compare favorably against the signature obtained from the uploaded audio data generated from the sound recorded at the predetermined time by each of the one or more other electronic devices. In such cases, the high frequency sound would be included in the sound recorded at the predetermined time by each of the one or more other electronic devices, but not in the sound recorded at the predetermined time by the user's electronic device.

In some embodiments, a user may be asked to record a sound clip using their device's microphone for some period of time. The unique notes (frequency) and timing of those notes within the sound clip serve as a unique signature identifier. The recorded sound clip may then be compared with other recording's notes (frequency) and timing of those notes, which other recordings may be recorded at the same time via one or more public microphones at the same location (i.e., the user's location is in a public space) and/or recorded at the same time by one or more other users at the same location. In doing so, the recorded sound clips at a given location may be used to facilitate the determination of the user's location at a specific time.

Moreover, the recorded sound clips at a given location may be used, in accordance with some embodiments, to create a sound library of different public locations that may be leveraged for future investigations.

Verification of a user's location using sound, in accordance with embodiments of the present invention, may be utilized in myriad applications, including, but not limited to: in banking, verifying the user's location while overseas to approve transactions; in online security, as a form of further identifying a user; in blockchain, verifying information about a user and/or cargo to record on the ledger; in medicine, verifying and keeping track of various visits to a doctor; in retail, as a form of rewarding users for their presence at a location; in IoT/blockchain, where a smart contract is linked to a cargo and requires the cargo location be updated every x seconds, the cargo records sound every x seconds, and the recorded sound is sent to a server for analysis to verify the cargo's location; and in criminal justice, where a tracking device worn by a criminal records sound every x seconds, and the recorded sound is sent to a server for analysis to verify the criminal's location.

In accordance with some embodiments, verification of a user's location at a specific time using sound may be accomplished seamlessly and securely without much user input. Verification of a user's location at a specific time using sound, in accordance with some embodiments, may be offered as a service (e.g. a cloud service) to other digital products in variety of fields, including, but limited to, banking, online security, blockchain, medicine, retail, IoT/blockchain, and criminal justice.

A rapidly growing information technology (IT) delivery model is cloud computing, by which shared resources, software, and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar, and/or collaboration infrastructure in the cloud, and an end user would use an appropriate client to access his or her email, or perform a calendar operation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, as well as removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"), and other non-removable, non-volatile media (e.g., a "solid-state drive"). Although not shown, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM or other optical media can be provided. In such instances, each can be connected to a bus 18 by one or more data media interfaces. As will be further described below, memory 28 may include a computer program product storing a set (e.g., at least one) of program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. In some embodiments, program modules 42 are adapted to generally carry out the one or more functions and/or methodologies of one or more embodiments.

Computer system/server 12 may also communicate with one or more external devices 14 such as a keyboard, a pointing device, a display 24, etc.; one or more devices that enable a user to interact with computer system/server 12; and/or any device (e.g., network card, modem, etc.) that enable computer system/server 12 to communicate with one or more other computing devices. Such communication can occur via Input/Output (I/O) interfaces 22. Still further, computer system/server 12 can communicate with one or more networks such as a local area network (LAN), a general wide area network (WAN), and/or a public network (e.g., the Internet) via network adapter 20. As depicted, the network adapter 20 communicates with other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
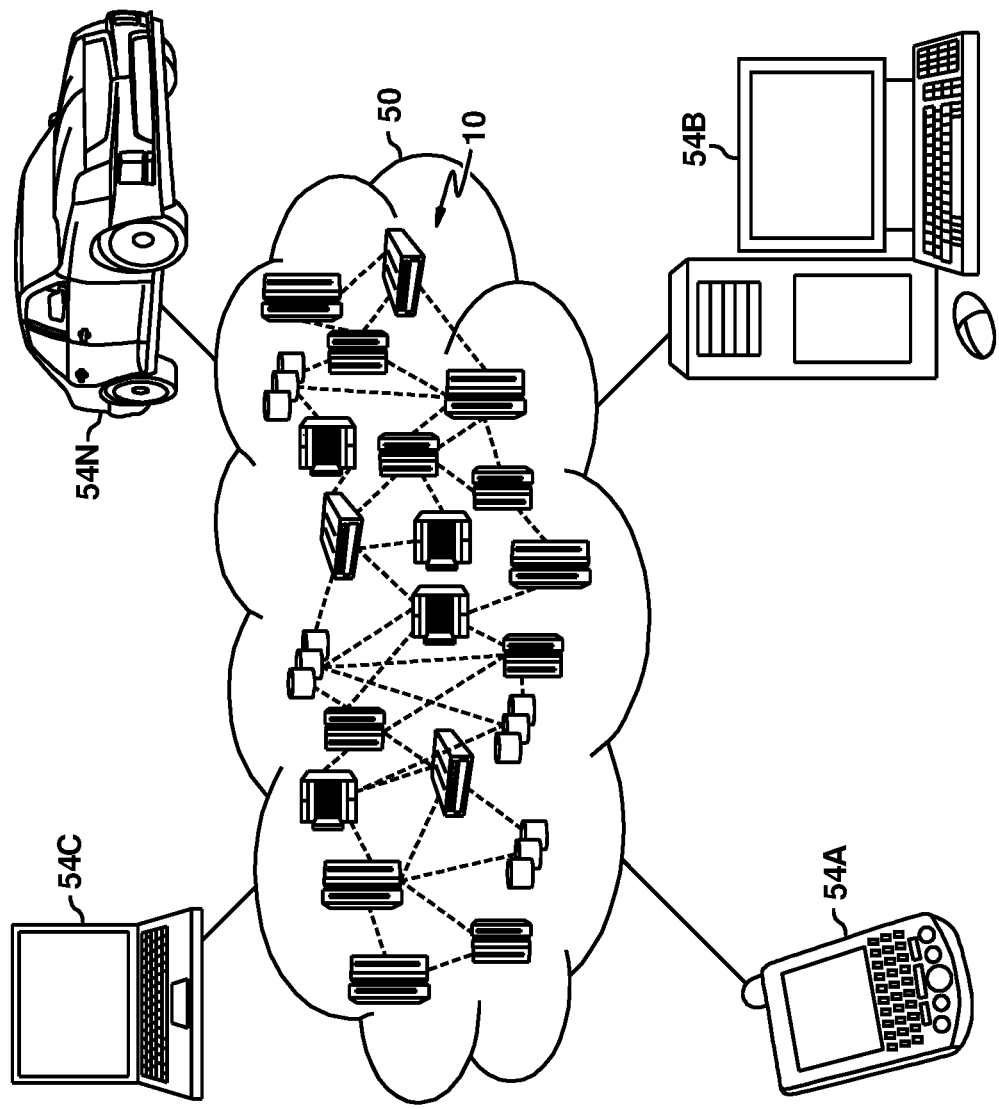
FIG. 2 depicts a cloud computing environment, according to one or more embodiments.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
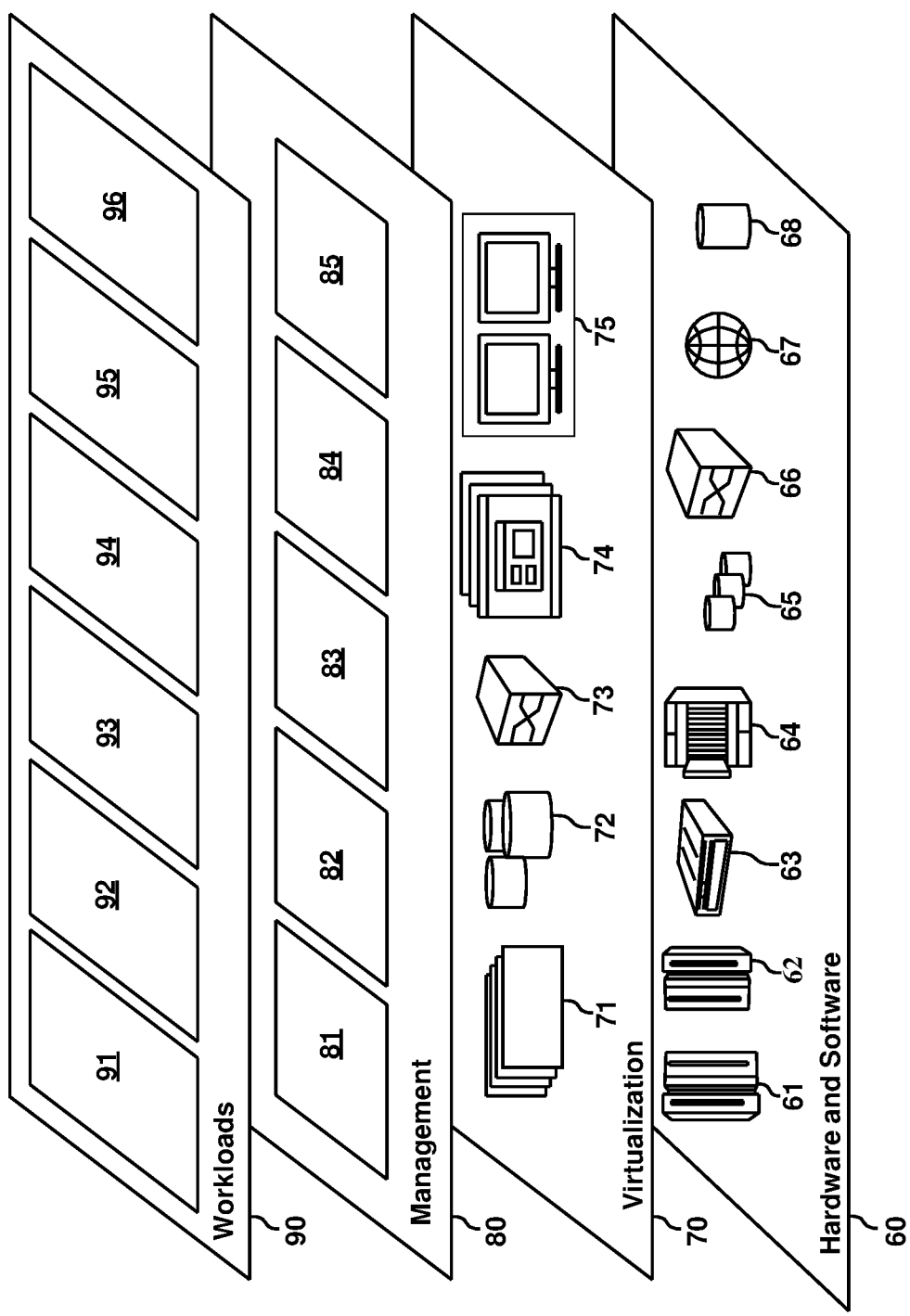
FIG. 3 depicts abstraction model layers, according to one or more embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sound-based location verification 96.

Figure 4:
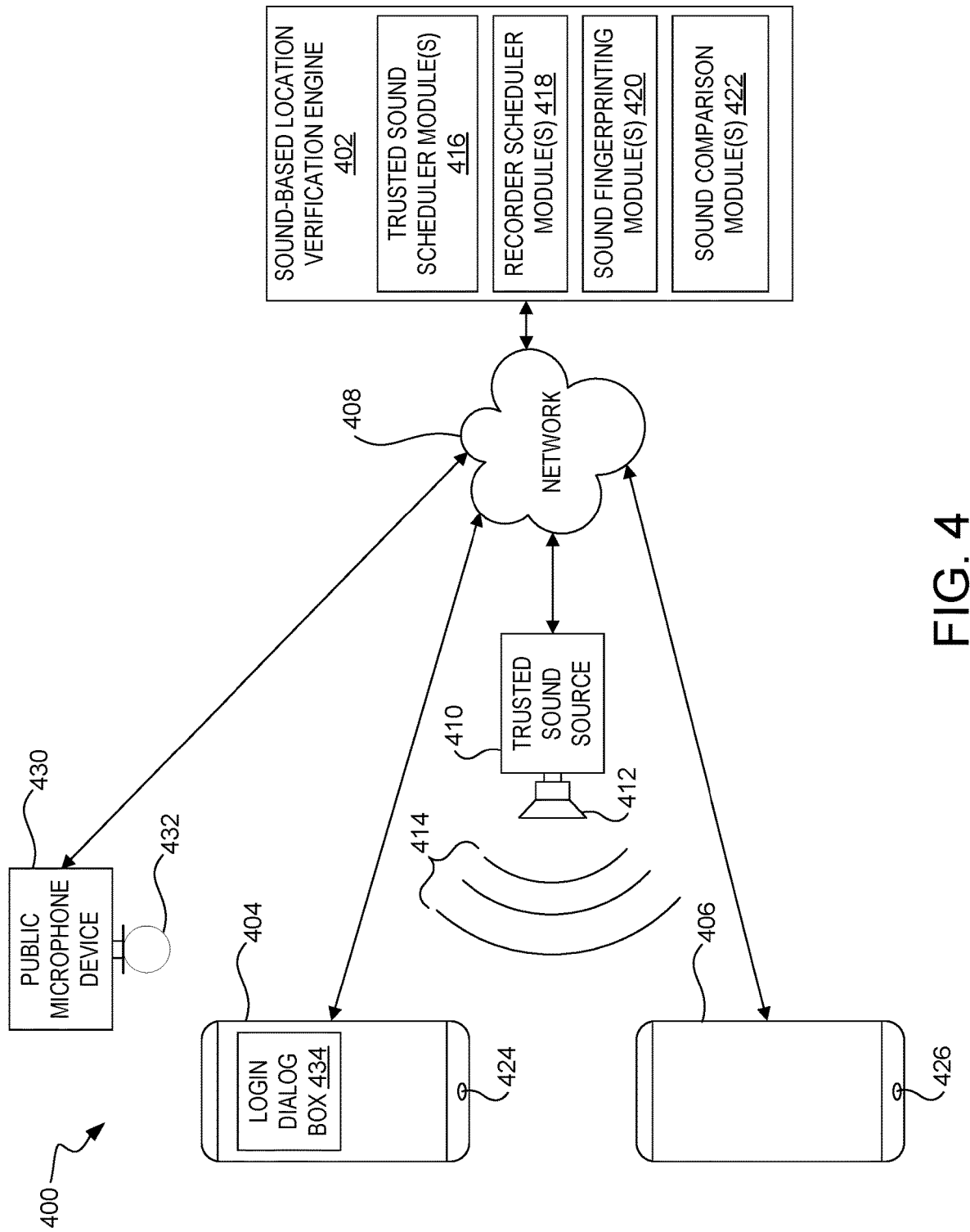
FIG. 4 depicts an exemplary system for verifying location using sound, according to one or more embodiments.

Referring now to FIG. 4, an exemplary system 400 for verifying location using sound is depicted, in accordance with one or more embodiments. The exemplary system 400 illustrated in FIG. 4 includes at least one sound-based location verification engine 402 in communication with a plurality of user electronic devices, such as one or more cellular phones 404 and 406, over one or more networks 408. Such networks 408 may include wired and wireless networks, including, but not limited to, a cellular network, a wide area network (WAN) (e.g., the Internet), and/or a local area network (LAN), non-limiting examples of which include cellular, WAN, wireless fidelity (Wi-Fi), Wi-Max, WLAN, radio communication, microwave communication, satellite communication, optical communication, sonic communication, electromagnetic induction communication, quantum communication, and/or any other suitable communication technology In the exemplary system 400 illustrated in FIG. 4, the sound-based location verification engine 402 is also in communication with one or more trusted sound sources (e.g., trusted sound source 410) and one or more public microphone devices (e.g., public microphone device 430) over the one or more networks 408.

In some embodiments, the cellular phone 404 may send a login request to the sound-based location verification engine 402 over the one or more networks 408. For example, the cellular phone 404 may send the login request to the sound-based location verification engine 402 in response to a user interacting with a login dialog box 434 (e.g., UserID and Password fields) displayed on the cellular phone 404. In some embodiments, the login request may include location data representing an unverified location (e.g., GPS-based) of the cellular phone 404. The unverified location of the cellular phone 404, in accordance with some of the embodiments of the present invention, may or may not be spoofed.

In some embodiments, the sound-based location verification engine 402 may schedule the cellular phone 404 to record a sound clip, during a predetermined time, using a microphone 424 of the cellular phone 404. The cellular phone 404 may then send the recorded sound clip to the sound-based location verification engine 402 for analysis. In accordance with some embodiments, the recorded sound clip the sound-based location verification engine 402 receives from the cellular phone 404 may or may not contain a trusted sound (e.g., produced by the trusted sound source 410) depending on whether or not the cellular phone 404 is actually located at the unverified location.

In some embodiments, the trusted sound source 410 may be located near the unverified location of the cellular phone 404 and may be activated to produce the trusted sound (e.g., infrasonic and/or ultrasonic sound). For example, the sound-based location verification engine 402 may identify the trusted sound source 410 as being located near the unverified location of the cellular phone 404 and schedule the trusted sound source 410 to activate, during the predetermined time, to produce the trusted sound near the unverified location of the cellular phone 404. In the exemplary system 400 illustrated in FIG. 4, the trusted sound source 410 activates a public address (PA) loudspeaker 412 or other sound source to produce the trusted sound (e.g., a series of chirps 414).

In some embodiments, the cellular phone 406 may be located near the unverified location of the cellular phone 404 and may be scheduled to record the trusted sound (e.g., infrasonic and/or ultrasonic sound produced by the trusted sound source 410). For example, the sound-based location verification engine 402 may identify the cellular phone 406 as being located near the unverified location of the cellular phone 404 and schedule the cellular phone 406 to record, during the predetermined time, the trusted sound (e.g., the series of chirps 414) using a microphone 426 of the cellular phone 406.

In some embodiments, the public microphone device 430 may be located near the unverified location of the cellular phone 404 and may be activated to record a trusted sound (e.g., infrasonic and/or ultrasonic sound produced by the trusted sound source 410). For example, the sound-based location verification engine 402 may identify the public microphone device 430 as being located near the unverified location of the cellular phone 404 and schedule the public microphone device 430 to activate, during the predetermined time, to record the trusted sound near the unverified location of the cellular phone 404. In the exemplary system 400 illustrated in FIG. 4, the public microphone device 430 controls a public microphone 432 to record the trusted sound (e.g., the series of chirps 414). The public microphone 432 may be located in a public place, such as a platform of a train station or a gate of an airport.

In accordance with some embodiments, the sound-based location verification engine 402 may identify one or more co-located electronic device(s), such as the cellular phone 406 and/or the public microphone device 430, as being located near the unverified location of the cellular phone 404 and schedule at least one of the one or more co-located electronic device(s) to record a sound clip during the predetermined time. The co-located electronic device(s) (e.g., cellular phone 406 and/or the public microphone device 430) may then send the recorded sound clip to the sound-based location verification engine 402 for analysis and comparison to the sound clip recorded by the cellular phone 404.

For example, the sound-based location verification engine 402 may identify the cellular phone 406 as being located near the unverified location of the cellular phone 404 and schedule the cellular phone 406 to record a sound clip, during the predetermined time, using the microphone 426 of the cellular phone 406. The cellular phone 406 may then send the recorded sound clip to the sound-based location verification engine 402 for analysis and comparison to the sound clip recorded by the cellular phone 404. In instances in which the unverified location of the cellular phone 404 is not spoofed, the recorded sound clip received by the sound-based location verification engine 402 from the cellular phone 406 will compare favorably with the recorded sound clip received from the cellular phone 404 (i.e., in instances in which the unverified location of the cellular phone 404 is not spoofed, each of the recorded sound clips contains the trusted sound). Conversely, in instances in which the unverified location of the cellular phone 404 is spoofed, the recorded sound clip received by the sound-based location verification engine 402 from the cellular phone 406 will not compare favorably with the recorded sound clip received from the cellular phone 404 (i.e., in instances in which the unverified location of the cellular phone 404 is spoofed, only the recorded sound clip received from the cellular phone 406 contains the trusted sound).

In accordance with some embodiments, the exemplary system 400 may employ encryption and/or digital signature schemes to ensure authenticity of the sound sources. For example, the sound clip(s) from the co-located electronic device(s), such as the cellular phone 406 and/or the public microphone device 430, may be encrypted and digitally signed (e.g., using previously shared encryption keys) to thwart the cellular phone 404 from spoofing its own location. Without employing encryption and/or digital signatures, an interloper electronic device acting in coordination with the cellular phone 404 and located near the unverified location of the cellular phone 404 may be able to intercept traffic of the co-located electronic device(s), copy the sound clip(s), and relay the same sound clip(s) to the cellular phone 404 for purposes of spoofing its own location.

In the exemplary system 400 illustrated in FIG. 4, the sound-based location verification engine 402 includes one or more trusted sound scheduler module(s) 416, one or more recorder scheduler module(s) 418, one or more sound fingerprint module(s) 420, and one or more sound comparison module(s) 422. The one or more trusted sound scheduler module(s) 416, the one or more recorder scheduler module(s) 418, the one or more sound fingerprint module(s) 420, and/or the one or more sound comparison module(s) 422 may be separate components as shown in the exemplary system 400 illustrated in FIG. 4, or may be combined in total or in part.

In some embodiments, the one or more sound scheduler module(s) 416 of the sound-based location verification engine 402 may schedule the trusted sound source 410 to activate during the predetermined time to produce the trusted sound near the unverified location of the cellular phone 404. The one or more sound scheduler module(s) 416, in some embodiments, may identify one or more trusted sound source device(s), such as the trusted sound source 410, as being located near the unverified location of the cellular phone 404 and schedule the one or more trusted sound source device(s) to activate during the predetermined time to produce the trusted sound near the unverified location of the cellular phone 404. For example, the one or more sound scheduler module(s) 416 may search a database (e.g., 1020 in FIG. 10) to identify one or more trusted sound source device(s) located near the unverified location of the cellular phone 404.

The one or more trusted sound source device(s), in accordance with some embodiments, may play multiple sounds at different tones (i.e., at different frequencies and/or different frequency bands) near the unverified location of the cellular phone 404 such that the sound captured by the cellular phone 404, the cellular phone 406, and/or the public microphone device 430, will contain all of those different tones in the environment. The different tones may respectively emanate from the same or different sound source devices. For example, one or more trusted sound source device(s) located near the unverified location of the cellular phone 404 may be activated, during the predetermined time and over a predefined interval (e.g., 5 seconds), to produce the trusted sound including sound at different short intervals (e.g., beep for 100 nanosecond) within the predefined interval respectively at different frequency bands, whereby the cellular phone 404, the cellular phone 406, and/or the public microphone device 430 may record a sound clip over 5 seconds capturing all those beeps at different frequency bands at different time slots. In some embodiments, a similarity score may be generated based on how many known tones can be seen in the sound clip received from the cellular phone 404. In some embodiments, the number of matches found in the sound clip received from the cellular phone 404 may be compared against the number of matches found in the sound clip(s) received from the co-located electronic device(s), such as the cellular phone 406 and/or the public microphone device 430.

In some embodiments, the one or more recorder scheduler module(s) 418 of the sound-based location verification engine 402 may schedule electronic devices, such as the cellular phone 404, the cellular phone 406, and/or the public microphone device 430, to record a sound clip during the predetermined time. For example, the one or more recorder scheduler module(s) 418 may schedule the cellular phone 404 to record a sound clip during the predetermined time. In addition, the one or more recorder scheduler module(s) 418 may identify one or more co-located electronic devices(s), such as the cellular phone 406 and/or the public microphone device 430, as being located near the unverified location of the cellular phone 404 and schedule at least one of the one or more co-located electronic device(s) to record a sound clip during the predetermined time. For example, the one or more recorder scheduler module(s) 418 may search a database (e.g., 1020 in FIG. 10) to identify one or more co-located electronic device(s) located near the unverified location of the cellular phone 404.

In some embodiments, the one or more sound fingerprinting module(s) 420 of the sound-based location verification engine 402 may generate one or more first audio fingerprints based on the recorded sound clip received from the cellular phone 404 and one or more second audio fingerprints based on the recorded sound clip received from at least one co-located electronic device (e.g., the cellular phone 406 or the public microphone device 430). In some embodiments, the one or more sound fingerprinting module(s) 420 of the sound-based location verification engine 402 may generate the respective audio fingerprints using conventional audio fingerprinting techniques well known to those skilled in the art. In some embodiments, the one or more sound fingerprinting module(s) 420 of the sound-based location verification engine 402 may generate the respective audio fingerprints using a conventional audio fingerprinting algorithm, such as Echoprint, Chromaprint, and the like. In some embodiments, the respective audio fingerprints may be generated, at least partially, by each of the respective electronic devices (i.e., the cellular phone 404 and the co-located electronic device), and sent to the sound-based location verification engine 402.

In some embodiments, the one or more sound comparison module(s) 422 of the sound-based location verification engine 402 may compare the respective audio fingerprints generated by the one or more sound fingerprinting module(s) 420 based on the recorded sound clip received from each of the respective electronic devices (i.e., the cellular phone 404 and the co-located electronic device). In some embodiments, the sound comparison module(s) 422 may compare the respective audio fingerprints to generate a similarity score representing a similarity between the sound clip received from each of the respective electronic devices (i.e., the cellular phone 404 and the co-located electronic device), determine whether the similarity score is equal to or exceeds a threshold similarity score, and generate a "location valid" signal in response to determining the similarity score is equal to or exceeds the threshold similarity score.

In some embodiments, the one or more sound fingerprinting module(s) 420 may be omitted. For example, the one or more comparison module(s) 422 of the sound based location verification engine 402 may directly compare features of the sound clips received from the respective electronic devices (i.e., the cellular phone 404 and the co-located electronic device). The sound comparison module(s) 422 may, for example, compare notes (frequency) and timing of those notes within the recorded sound clip received from the cellular phone 404 and notes (frequency) and timing of those notes within the recorded sound clip received from the co-located electronic device (e.g., the cellular phone 406 or the public microphone device 430) to generate a similarity score representing a similarity between the sound clip received from each of the respective electronic devices (i.e., the cellular phone 404 and the co-located electronic device), determine whether the similarity score is equal to or exceeds a threshold similarity score, and generate a "location valid" signal in response to determining the similarity score is equal to or exceeds the threshold similarity score.

In some embodiments, cargo may be fitted with an electronic device that controls a microphone and a speaker, wherein the electronic device may activate the speaker and record sound every x seconds using the microphone to verify the cargo's location. The sound recorded by the electronic device may be sent to a server and compared to sound recorded by another electronic device located near the supposed location of the cargo at a given time (e.g., based on the cargo's intended route schedule and/or the cargo's GPS-based location). In some embodiments, a speaker of a first piece of cargo may be activated to produce trusted sound and a microphone of a second nearby piece of cargo may be activated to record the trusted sound, wherein the first and the second pieces of cargo are supposed to be close to each other, such as in a cargo ship. In some embodiments, wherein cargo is transported on a truck or other vehicle, trusted sound may be played from trusted sound sources mounted on objects along an approved route (e.g., nearby lamp posts) to detect whether or not the cargo is moving along the approved route. Similarly, in some embodiments, coordination among multiple devices may be employed to authenticate servers/computers/personnel in an office building or other space (e.g., for authenticating a technician servicing a data center).

In some embodiments, a dementia patient may be outfitted with a mobile device (e.g., a smart watch or bracelet) on which resides a mobile app that controls a microphone and a speaker, wherein the mobile app may activate the speaker and record sound every x seconds using the microphone to verify the dementia patient's supposed location. The recorded sound may be sent to a server and compared to sound recorded by another electronic device located near the supposed location of the dementia patient at a given time (e.g., based the dementia patient's calendar of scheduled activities and/or the dementia patient's GPS-based location).

In some embodiments, a criminal may be required to wear a tracking device that controls a microphone and a speaker, wherein the tracking device may activate the speaker and record sound every x seconds using the microphone to verify the criminal's supposed location. The recorded sound may be sent to a server and compared to sound recorded by another electronic device located near the supposed location of the criminal at a given time (e.g., based on the prisoner's calendar of scheduled activities and/or the prisoner's GPS-based location).

In some embodiments, the system (e.g., the exemplary system 400) will ask the user to take a photo while keeping the microphone on. The system may then embed the sound in the photo as metadata. The sound embedded in the image may be used for comparison against other sound recorded by the system.

In some embodiments, speakers in public transport vehicles (e.g., buses, taxis, airplanes, boats, ferries, etc.) equipped with GPS may be used for playing the trusted sound. This will allow the trusted sound to be employed beyond static locations (such as airports and train stations) and become more ubiquitous.

In some embodiments, high or low frequencies may be embedded in various sounds in the environment as unique location signatures. For example, by adding a low frequency sound source to the lower part of city streets (e.g., installing a speaker on the base of sign posts), low frequency sound may be embedded in the environmental sounds of each street, wherein the embedded low frequency sound of each successive street may increase in frequency. In one concrete example, the low frequency sound may be embedded within the pedestrian crossing sound, resulting in each traffic intersection emitting a unique frequency signature that may be used by the system (e.g., the exemplary system 400) for location/time verification of a user. In some embodiments, the frequencies at each of the respective traffic intersections may change every x seconds to maintain higher security.

In some embodiments, the length of recording may also be used as a measure of increased "security" versus "user convenience". Where, for example, bank transactions may require longer recordings for increased security because banking is considered to have a higher severity with respect to loss potential for the user.

Figure 5:
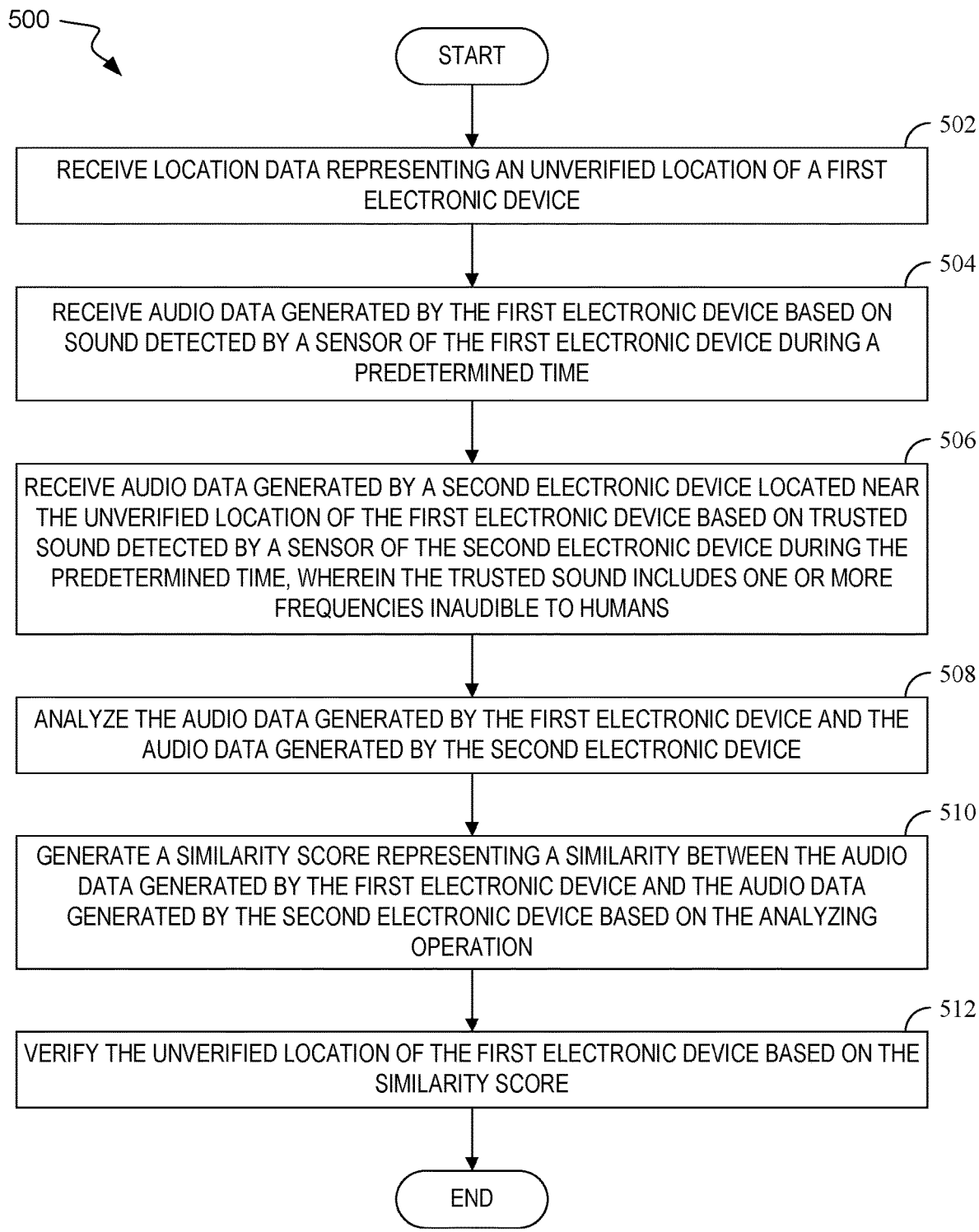
FIG. 5 depicts a flow diagram of an illustrative method of verifying location using sound, according to one or more embodiments.

Referring now to FIG. 5, a flow diagram 500 of an illustrative method of verifying location using sound is depicted, in accordance with one or more embodiments. The method 500 sets forth the preferred order of the blocks. It must be understood, however, that the various blocks may occur at any time relative to one another.

The method 500 begins by receiving location data representing an unverified location of a first electronic device (block 502). For example, at block 502, the unverified location of the first electronic device (e.g., the cellular phone 404 in FIG. 4) may be received by a sound-based location verification engine (e.g., the sound-based location verification engine 402 in FIG. 4) over a network (e.g., the network 408 in FIG. 4). The sound-based location verification engine may, for example, reside on one or more server systems (e.g., the one or more server systems 1004, 1014 in FIG. 10).

A user of the first electronic device (e.g., the cellular phone 404 in FIG. 4) may, in an example implementation, request that he/she be verified as being present at a particular location. For example, the user may send such a request to the sound-based location verification engine over a network (e.g., the network 408 in FIG. 4). The user may, for example, state, "I'm at airport x, gate 3 now." In response to receiving the request, at block 502, one or more recorder scheduler module(s) (e.g., the recorder scheduler module(s) 418 in FIG. 4) of the sound-based location verification engine may schedule the first electronic device to record a sound clip at a specific time (e.g., in 5 seconds, exemplified by 11:36:15 am). Also, at block 502, the one or more recorder scheduler module(s) of the sound-based location verification engine may schedule a second electronic device (e.g., the cellular phone 406 and/or the public microphone device 430 in FIG. 4) located near the unverified location of the first electronic device/user (i.e., airport x, gate 3) to record at that same specific time (e.g., the exemplary time of 11:36:15 am) at airport x, gate 3. For example, the recorder scheduler module(s) may search one or more databases (e.g., the one or more databases 1020 in FIG. 10) to identify one or more co-located electronic device(s) as being located near the unverified location of the of the first electronic device/user (i.e., airport x, gate 3) and designate one of the co-located electronic device(s) as the second electronic device. In some embodiments, the second electronic device may be a cellular phone (e.g., the cellular phone 406 in FIG. 4), an electronic device that controls a public microphone in a public place (e.g., the public microphone device 430 in FIG. 4), or some other electronic device. For example, a public microphone may be controlled by the second electronic device, such as a security system that monitors audio-visual (AV) at the airport x.

The method 500 continues by receiving audio data generated by the first electronic device based on sound detected by a sensor of the first electronic device during a predetermined time (block 504). For example, at block 504, audio data generated by the first electronic device (e.g., the cellular phone 404 in FIG. 4) based on sound detected by a sensor (e.g., the microphone 424 in FIG. 4) of the first electronic device during a predetermined time (e.g., the exemplary time of 11:36:15 am) may be received by a sound-based location verification engine (e.g., the sound-based location verification engine 402 in FIG. 4) over a network (e.g., the network 408 in FIG. 4).

Also, the method 500 continues by receiving audio data generated by the second electronic device located near the unverified location of the first electronic device based on trusted sound detected by a sensor of the second electronic device during the predetermined time, wherein the trusted sound includes one or more frequencies inaudible to humans (block 506). For example, at block 506, audio data generated by the second electronic device (e.g., the cellular phone 406 in FIG. 4) located near the unverified location of the first electronic device (e.g., the cellular phone 404 in FIG. 4) based on trusted sound detected by a sensor (e.g., the microphone 426 in FIG. 4) of the second electronic device during the predetermined time (e.g., the exemplary time of 11:36:15 am) may be received by a sound-based location verification engine (e.g., the sound-based location verification engine 402 in FIG. 4) over a network (e.g., the network 408 in FIG. 4). In some embodiments, the trusted sound may be produced by a trusted sound source (e.g., the trusted sound source 410 in FIG. 4) located near the unverified location of the first electronic device and scheduled by the sound-based location verification engine to activate during the predetermined time. Such an embodiment is exemplified within the method 700 in FIG. 7, described below. In other embodiments, the trusted sound may be produced (e.g., constantly, periodically, or intermittently) by a trusted sound source located near the unverified location of the first electronic device without intervention by the sound-based location verification engine.

The method 500 then continues by analyzing the audio data generated by the first electronic device and the audio data generated by the second electronic device (block 508). For example, at block 508, one or more sound comparison modules (e.g., the sound comparison module(s) 422 in FIG.

4) of the sound-based location verification engine may determine notes (frequency) and timing of those notes within the audio data received from the first electronic device (e.g., the cellular phone 404 in FIG. 4) and determine notes (frequency) and timing of those notes within the audio data received from the second electronic device (e.g., the cellular phone 406 in FIG. 4). In some embodiments, at block 508, one or more sound fingerprinting modules (e.g., sound fingerprinting modules(s) 420 in FIG. 4) of the sound-based location verification engine may analyze the audio data generated by the first electronic device and the audio data generated by the second electronic device by generating one or more first audio fingerprints based on the audio data received from the first electronic device and by generating one or more second audio fingerprints based on the audio data received from the second electronic device. Such an embodiment is exemplified within the method 600 in FIG. 6, described below.

The method 500 then continues by generating a similarity score representing a similarity between the audio data generated by the first electronic device and the audio data generated by the second electronic device based on the analyzing operation performed in block 508 (block 510). For example, at block 510, one or more sound comparison modules (e.g., the sound comparison module(s) 422 in FIG. 4) of the sound-based location verification engine may generate the similarity score by comparing notes (frequency) and timing of those notes within the audio data received from the respective electronic devices (e.g., the respective cellular phones 404, 406 in FIG. 4). In some embodiments, at block 510, one or more sound comparison modules (e.g., the sound comparison module(s) 422 in FIG. 4) of the sound-based location verification engine may generate a similarity score based on comparing the one or more first audio fingerprints (i.e., based on the audio data received from the first electronic device) and the one or more second audio fingerprints (i.e., based on the audio data received from the second electronic device). Such an embodiment is exemplified within the method 600 in FIG. 6, described below.

The method then continues by verifying the unverified location of the first electronic device based on the similarity score generated in block 510 (block 512). For example, at block 512, one or more sound comparison modules (e.g., the sound comparison module(s) 422 in FIG. 4) of the sound-based location verification engine may determine whether the similarity score is equal to or exceeds a threshold similarity score, and generate a "location valid" signal in response to determining the similarity score is equal to or exceeds the threshold similarity score. On the other hand, at block 512, in response to determining the similarity score is less than the threshold similarity score, the one or more sound comparison modules may generate a "location not valid" signal. In cases where the "location not valid" signal is generated, the one or more sound comparison modules may send a "denied" status signal to the first electronic device (i.e., the cellular phone 404 in FIG. 4) as feedback to indicate failure to verify. Also, in cases where the "location not valid" signal is generated, the user of the first electronic device may be requested to make another recording.

Figure 6:
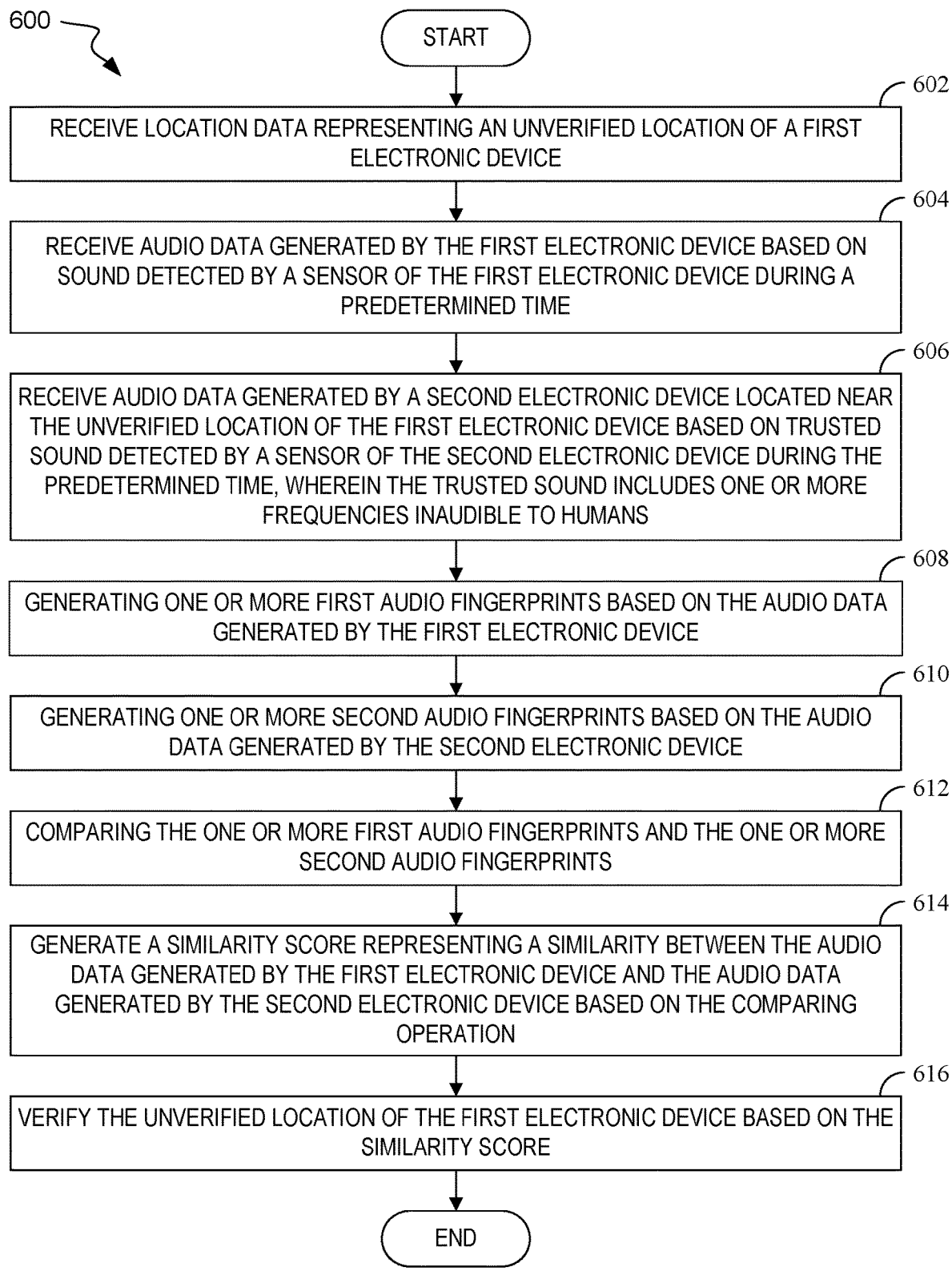
FIG. 6 depicts a flow diagram of an illustrative method of verifying location using sound, which illustrative method includes generating and comparing audio fingerprints, according to one or more embodiments.

Referring now to FIG. 6, a flow diagram 600 of an illustrative method of verifying location using sound is depicted, which illustrative method includes generating and comparing audio fingerprints, in accordance with one or more embodiments. The method 600 sets forth the preferred order of the blocks. It must be understood, however, that the various blocks may occur at any time relative to one another.

The method 600 begins by receiving location data representing an unverified location of a first electronic device (block 602). For example, at block 602, the unverified location of the first electronic device (e.g., the cellular phone 404 in FIG. 4) may be received by a sound-based location verification engine (e.g., the sound-based location verification engine 402 in FIG. 4) over a network (e.g., the network 408 in FIG. 4). Block 602 within the method 600 in FIG. 6 may correspond to block 502 within the method 500 in FIG. 5.

A user of the first electronic device (e.g., the cellular phone 404 in FIG. 4) may, in an example implementation, request that she/he be verified as being present at a particular location. For example, the user may send such a request to the sound-based location verification engine over a network (e.g., the network 408 in FIG. 4). The user may, for example, state, "I'm at airport x, gate 3 now." In response to receiving the request, at block 602, one or more recorder scheduler module(s) (e.g., the recorder scheduler module(s) 418 in FIG. 4) of the sound-based location verification engine may schedule the first electronic device to record a sound clip at a specific time (e.g., in 5 seconds, exemplified by 11:36:15 am). Also, at block 602, the one or more recorder scheduler module(s) of the sound-based location verification engine may schedule a second electronic device (e.g., the cellular phone 406 and/or the public microphone device 430 in FIG. 4) located near the unverified location of the first electronic device/user (i.e., airport x, gate 3) to record at that same specific time (e.g., the exemplary time of 11:36:15 am) at airport x, gate 3. For example, the recorder scheduler module(s) may search one or more databases (e.g., the one or more databases 1020 in FIG. 10) to identify one or more co-located electronic device(s) as being located near the unverified location of the of the first electronic device/user (i.e., airport x, gate 3) and designate one of the co-located electronic device(s) as the second electronic device. In some embodiments, the second electronic device may be a cellular phone (e.g., the cellular phone 406 in FIG. 4), an electronic device that controls a public microphone in a public place (e.g., the public microphone device 430 in FIG. 4), or some other electronic device. For example, a public microphone may be controlled by the second electronic device, such as a security system that monitors audio-visual (AV) at the airport x.

The method 600 continues by receiving audio data generated by the first electronic device based on sound detected by a sensor of the first electronic device during a predetermined time (block 604). For example, at block 604, audio data generated by the first electronic device (e.g., the cellular phone 404 in FIG. 4) based on sound detected by a sensor (e.g., the microphone 424 in FIG. 4) of the first electronic device during a predetermined time (e.g., the exemplary time of 11:36:15 am) may be received by a sound-based location verification engine (e.g., the sound-based location verification engine 402 in FIG. 4) over a network (e.g., the network 408 in FIG. 4). Block 604 within the method 600 in FIG. 6 may correspond to block 504 within the method 500 in FIG. 5.

Also, the method 600 continues by receiving audio data generated by the second electronic device located near the unverified location of the first electronic device based on trusted sound detected by a sensor of the second electronic device during the predetermined time, wherein the trusted sound includes one or more frequencies inaudible to humans (block 606). For example, at block 606, audio data generated by the second electronic device (e.g., the cellular phone 406 in FIG. 4) located near the unverified location of the first electronic device (e.g., the cellular phone 404 in FIG. 4) based on trusted sound detected by a sensor (e.g., the microphone 426 in FIG. 4) of the second electronic device during the predetermined time (e.g., the exemplary time of 11:36:15 am) may be received by a sound-based location verification engine (e.g., the sound-based location verification engine 402 in FIG. 4) over a network (e.g., the network 408 in FIG. 4). Block 606 within the method 600 in FIG. 6 may correspond to block 506 within the method 500 in FIG. 5.

The method 600 then continues by generating one or more first audio fingerprints based on the audio data generated by the first electronic device (block 608). In some embodiments, at block 608, one or more sound fingerprinting modules (e.g., the sound fingerprinting module(s) 420 in FIG. 4) of the sound-based location verification engine may generate one or more first audio fingerprints based on the audio data received from the first electronic device (e.g., the cellular phone 404 in FIG. 4) using conventional audio fingerprinting techniques well known to those skilled in the art. For example, at block 608, generating one or more first audio fingerprints may include pre-processing the audio data received from the first electronic device using one or more filters (e.g., a low-pass filter and/or a high-pass filter), converting the pre-processed audio data into a spectrogram, dividing the spectrogram into a plurality of spectral images, computing wavelets based on the plurality of spectral images, extracting the top-t spectral images based on magnitude, and generating a bit vector as a binary representation of the top-t spectral images. In some embodiments, at block 608, one or more sound fingerprinting modules (e.g., the sound fingerprinting module(s) 420 in FIG. 4) of the sound-based location verification engine may generate one or more first audio fingerprints based on the audio data received from the first electronic device using a conventional audio fingerprinting algorithm, such as Echoprint, Chromaprint, and the like. In some embodiments, the one or more first audio fingerprints may be generated, at least partially, by the first electronic device and sent to the sound-based location verification engine.

The method 600 then continues by generating one or more second audio fingerprints based on the audio data generated by the second electronic device (block 610). In some embodiments, at block 610, one or more sound fingerprinting modules (e.g., the sound fingerprinting module(s) 420 in FIG. 4) of the sound-based location verification engine may generate one or more second audio fingerprints based on the audio data received from the second electronic device (e.g., the cellular phone 406 in FIG. 4) using conventional audio fingerprinting techniques well known to those skilled in the art. For example, at block 610, generating one or more second audio fingerprints may include pre-processing the audio data received from the second electronic device using one or more filters (e.g., a low-pass filter and/or a high-pass filter), converting the pre-processed audio data into a spectrogram, dividing the spectrogram into a plurality of spectral images, computing wavelets based on the plurality of spectral images, extracting the top-t spectral images based on magnitude, and generating a bit vector as a binary representation of the top-t spectral images. In some embodiments, at block 608, one or more sound fingerprinting modules (e.g., the sound fingerprinting module(s) 420 in FIG. 4) of the sound-based location verification engine may generate one or more second audio fingerprints based on the audio data received from the second electronic device using a conventional audio fingerprinting algorithm, such as Echoprint, Chromaprint, and the like. In some embodiments, the one or more second audio fingerprints may be generated, at least partially, by the second electronic device and sent to the sound-based location verification engine.

The method 600 then continues by comparing the one or more first audio fingerprints and the one or more second audio fingerprints (block 612). As noted above, the one or more first audio fingerprints and the one or more second audio fingerprints can include respective bit vectors. In some embodiments, at block 612, one or more sound comparison modules (e.g., the sound comparison module(s) 422 in FIG. 4) of the sound-based location verification engine may compare the respective bit vectors against each other for similarity.

The method 600 then continues by generating a similarity score representing a similarity between the audio data generated by the first electronic and the audio data generated by the second electronic device (block 614). For example, at block 614, one or more sound comparison modules (e.g., the sound comparison module(s) 422 in FIG. 4) of the sound-based location verification engine may generate a similarity score based on comparing the respective bit vectors against each other for similarity. In some implementations, the similarity score can range between 0 and 1, wherein 1 indicates that the unverified location of the first electronic device is valid, and wherein 0 indicates that the unverified location of the first electronic device is not valid. Block 614 within the method 600 in FIG. 6 may correspond to block 510 within the method 500 in FIG. 5.

The method 600 then continues by verifying the unverified location of the first electronic device based on the similarity score generated in block 614 (block 616). For example, at block 616, one or more sound comparison modules (e.g., the sound comparison module(s) 422 in FIG. 4) of the sound-based location verification engine may determine whether the similarity score is equal to or exceeds a threshold similarity score, and generate a "location valid" signal in response to determining the similarity score is equal to or exceeds the threshold similarity score. On the other hand, at block 616, in response to determining the similarity score is less than the threshold similarity score, the one or more sound comparison modules may generate a "location not valid" signal. In cases where the "location not valid" signal is generated, the one or more sound comparison modules may send a "denied" status signal to the first electronic device (i.e., the cellular phone 404 in FIG. 4) as feedback to indicate failure to verify. Also, in cases where the "location not valid" signal is generated, the user of the first electronic device may be requested to make another recording. Block 616 within the method 600 in FIG. 6 may correspond to block 512 within the method 500 in FIG. 5.

Figure 7:
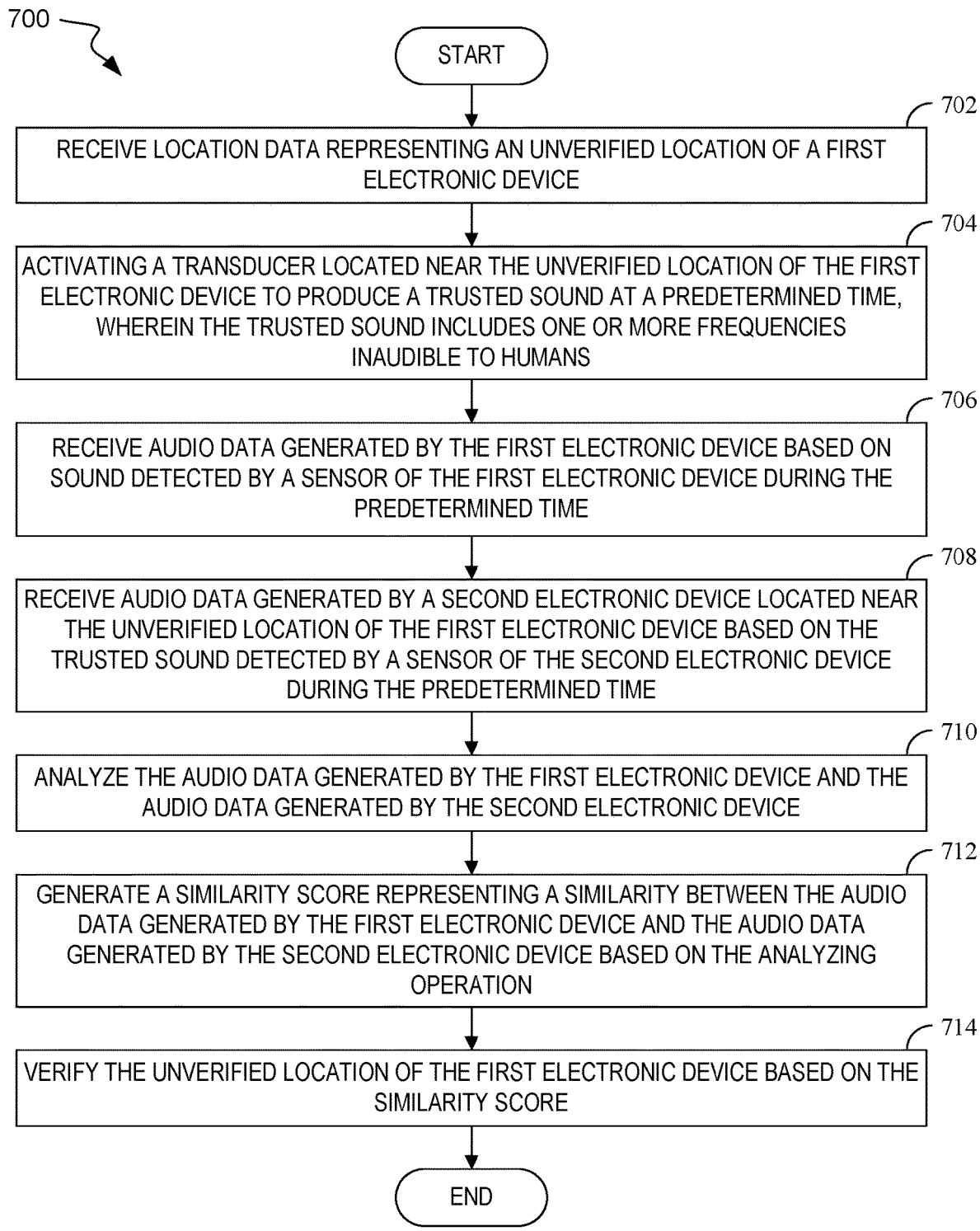
FIG. 7 depicts a flow diagram of an illustrative method of verifying location using sound, which illustrative method includes activating a transducer to produce a trusted sound, according to one or more embodiments.

Referring now to FIG. 7, a flow diagram 700 of an illustrative method of verifying location using sound is depicted, which illustrative method includes activating a transducer (e.g., a speaker) to produce a trusted sound, in accordance with one or more embodiments. The method 700 sets forth the preferred order of the blocks. It must be understood, however, that the various blocks may occur at any time relative to one another.

The method 700 begins by receiving location data representing an unverified location of a first electronic device (block 702). For example, at block 702, the unverified location of the first electronic device (e.g., the cellular phone 404 in FIG. 4) may be received by a sound-based location verification engine (e.g., the sound-based location verification engine 402 in FIG. 4) over a network (e.g., the network 408 in FIG. 4). Block 702 within the method 700 in FIG. 7 may correspond to block 502 within the method 500 in FIG. 5.

A user of the first electronic device (e.g., the cellular phone 404 in FIG. 4) may, in an example implementation, request that he/she be verified as being present at a particular location. For example, the user may send such a request to the sound-based location verification engine over a network (e.g., the network 408 in FIG. 4). The user may, for example, state, "I'm at airport x, gate 3 now." In response to receiving the request, at block 702, one or more recorder scheduler module(s) (e.g., the recorder scheduler module(s) 418 in FIG. 4) of the sound-based location verification engine may schedule the first electronic device to record a sound clip at a specific time (e.g., in 5 seconds, exemplified by 11:36:15 am). Also, at block 702, the one or more recorder scheduler module(s) of the sound-based location verification engine may schedule a second electronic device (e.g., the cellular phone 406 and/or the public microphone device 430 in FIG. 4) located near the unverified location of the first electronic device/user (i.e., airport x, gate 3) to record at that same specific time (e.g., the exemplary time of 11:36:15 am) at airport x, gate 3. For example, the recorder scheduler module(s) may search one or more databases (e.g., the one or more databases 1020 in FIG. 10) to identify one or more co-located electronic device(s) as being located near the unverified location of the of the first electronic device/user (i.e., airport x, gate 3) and designate one of the co-located electronic device(s) as the second electronic device. In some embodiments, the second electronic device may be a cellular phone (e.g., the cellular phone 406 in FIG. 4), an electronic device that controls a public microphone in a public place (e.g., the public microphone device 430 in FIG. 4), or some other electronic device. For example, a public microphone may be controlled by the second electronic device, such as a security system that monitors audio-visual (AV) at the airport x.

The method 700 continues by activating a transducer (e.g., a speaker) located near the unverified location of the first electronic device to produce a trusted sound at a predetermined time, wherein the trusted sound includes one or more frequencies inaudible to humans (block 704). For example, one or more trusted sound scheduler modules (e.g., the trusted sound scheduler modules 416 in FIG. 4) of the sound-based location verification engine may schedule a trusted sound source (e.g., the trusted sound source 410 in FIG. 4) to produce the trusted sound (e.g., infrasonic and/or ultrasonic sound) at the predetermined time (e.g., the exemplary time of 11:36:15 am). The trusted sound scheduler module(s) may, for example, search one or more databases (e.g., the one or more databases 1020 in FIG. 10) to identify at least one trusted sound source as being located near the unverified location of the of the first electronic device (e.g., the cellular phone 404 in FIG. 4). For example, the trusted sound source may activate a public address (PA) loudspeaker to produce the trusted sound at the unverified location of the first electronic device/user.

The method 700 continues by receiving audio data generated by the first electronic device based on sound detected by a sensor of the first electronic device during the predetermined time (block 706). For example, at block 706, audio data generated by the first electronic device based on sound detected by a sensor (e.g., the microphone 424 in FIG. 4) of the first electronic device (e.g., the cellular phone 404 in FIG. 4) during a predetermined time (e.g., the exemplary time of 11:36:15 am) may be received by a sound-based location verification engine (e.g., the sound-based location verification engine 402 in FIG. 4) over a network (e.g., the network 408 in FIG. 4). Block 706 within the method 700 in FIG. 7 may correspond to block 504 within the method 500 in FIG. 5.

Also, the method 700 continues by receiving audio data generated by the second electronic device located near the unverified location of the first electronic device based on the trusted sound detected by a sensor of the second electronic device during the predetermined time (block 708). For example, at block 708, audio data generated by the second electronic device (e.g., the cellular phone 406 in FIG. 4) located near the unverified location of the first electronic device (e.g., the cellular phone 404 in FIG. 4) based on the trusted sound detected by a sensor (e.g., the microphone 426 in FIG. 4) of the second electronic device during the predetermined time (e.g., the exemplary time of 11:36:15 am) may be received by a sound-based location verification engine (e.g., the sound-based location verification engine 402 in FIG. 4) over a network (e.g., the network 408 in FIG. 4). Block 708 within the method 700 in FIG. 7 may correspond to block 506 within the method 500 in FIG. 5.

The method 700 then continues by analyzing the audio data generated by the first electronic device and the audio data generated by the second electronic device (block 710). For example, at block 710, one or more sound comparison modules (e.g., the sound comparison module(s) 422 in FIG. 4) of the sound-based location verification engine may determine notes (frequency) and timing of those notes within the audio data received from the first electronic device (e.g., the cellular phone 404 in FIG. 4) and determine notes (frequency) and timing of those notes within the audio data received from the second electronic device (e.g., the cellular phone 406 in FIG. 4). Block 710 within the method 700 in FIG. 7 may correspond to block 508 within the method 500 in FIG. 5.

The method 700 continues by generating a similarity score representing a similarity between the audio data generated by the first electronic device and the audio data generated by the second electronic device based on the analyzing operation performed in block 710 (block 712). For example, at block 712, one or more sound comparison modules (e.g., the sound comparison module(s) 422 in FIG. 4) of the sound-based location verification engine may generate the similarity score by comparing notes (frequency) and timing of those notes within the audio data received from the respective electronic devices (e.g., the respective cellular phones 404, 406 in FIG. 4). Block 712 within the method 700 in FIG. 7 may correspond to block 510 within the method 500 in FIG. 5.

The method 700 then continues by verifying the unverified location of the first electronic device based on the similarity score generated in block 712 (block 714). For example, at block 712, one or more sound comparison modules (e.g., the sound comparison module(s) 422 in FIG. 4) of the sound-based location verification engine may determine whether the similarity score is equal to or exceeds a threshold similarity score, and generate a "location valid" signal in response to determining the similarity score is equal to or exceeds the threshold similarity score. On the other hand, at block 712, in response to determining the similarity score is less than the threshold similarity score, the one or more sound comparison modules may generate a "location not valid" signal. In cases where the "location not valid" signal is generated, the one or more sound comparison modules may send a "denied" status signal to the first electronic device (i.e., the cellular phone 404 in FIG. 4) as feedback to indicate failure to verify. Also, in cases where the "location not valid" signal is generated, the user of the first electronic device may be requested to make another recording. Block 712 within the method 700 in FIG. 7 may correspond to block 512 within the method 500 in FIG. 5.

Figure 8A:
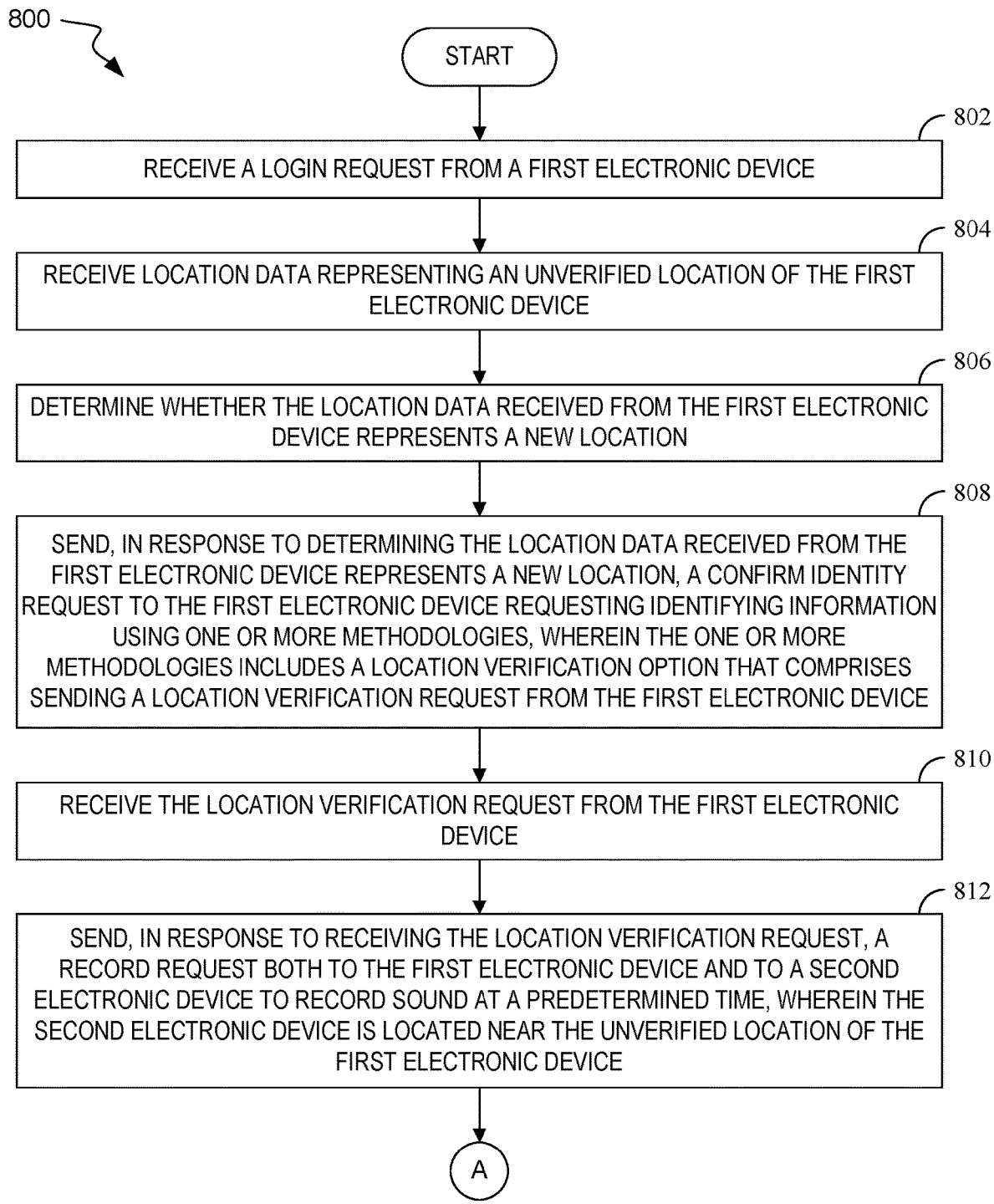
FIGS. 8A-8B depict a flow diagram of an illustrative method of verifying location using sound within the context of a login application in response to determining location data received from an electronic device from which a login request is received represents a new location, according to one or more embodiments.
Figure 8B:
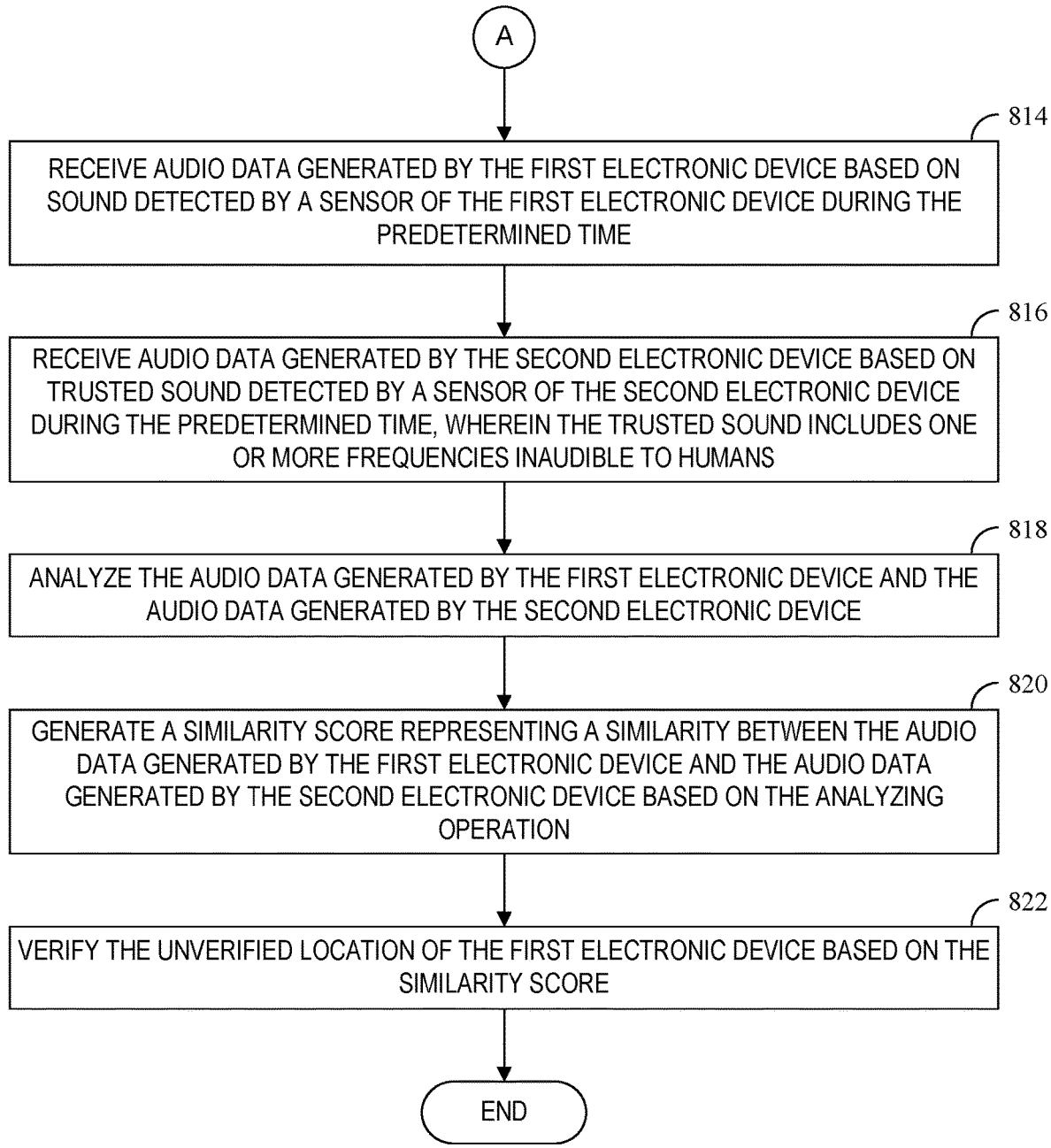

Referring now to FIGS. 8A-8B, a flow diagram of an illustrative method 800 of verifying location using sound is depicted within the context of a login application in response to determining location data received from an electronic device from which a login request is received represents a new location, in accordance with one or more embodiments. The method 800 sets forth the preferred order of the blocks. It must be understood, however, that the various blocks may occur at any time relative to one another.

The method 800 begins by receiving a login request from a first electronic device (block 802). For example, at block 802, the login request from the first electronic device (e.g., the cellular phone 404 in FIG. 4) may be received by a sound-based location verification engine (e.g., the sound-based location verification engine 402 in FIG. 4) over a network (e.g., the network 408 in FIG. 4). In some embodiments, the first electronic device may send the login request to the sound-based location verification engine in response to a user trying to log into a cloud-based system by entering credentials (e.g., UserID and Password fields) into a login dialog box (e.g., the login dialog box 434 in FIG. 4) displayed on the first electronic device.

The method 800 continues by receiving location data representing an unverified location of the first electronic device (block 804). For example, at block 804, the location data from the first electronic device (e.g., the cellular phone 404 in FIG. 4) may be received by a sound-based location verification engine (e.g., the sound-based location verification engine 402 in FIG. 4) over a network (e.g., the network 408 in FIG. 4). In some embodiments, in response to the sound-based location verification engine having received the login request at block 802, the user may be requested to provide her/his location (i.e., the unverified location of the first electronic device) and/or authorize transmission of her/his location to the sound-based location verification engine. The unverified location of the first electronic device, in accordance with some of the embodiments of the present invention, may or may not be spoofed. In some embodiments, the unverified location of the first electronic device may be GPS-based. For example, the unverified location of the first electronic device may be generated using a GPS (e.g., the GPS 1046 in FIG. 10) of the first electronic device. In some embodiments, the unverified location of the first electronic device may be input by the user of the first electronic device. For example, the user may input the unverified location of the first electronic device by interacting with a user input device (e.g., the user input device 1044 in FIG. 10) of the first electronic device, a touch screen (e.g., the display 1042 in FIG. 10) of the first electronic device, and/or a microphone (e.g., the microphone 1048 in FIG. 10) of the first electronic device. The user may, for example, state or type, "I'm at train station x on platform 3 now." Natural language processing (NLP) may be employed to determine the location data based on such speech or text.

In some embodiments, blocks 802 and 804 may be combined. For example, the login request received at block 802 may include location data representing an unverified location of the first electronic device (e.g., the cellular phone 404 in FIG. 4).

The method 800 continues by determining whether the location data received from the first electronic device represents a new location (block 806). For example, at block 806, the sound-based location verification engine (e.g., the sound-based location verification engine 402 in FIG. 4) may determine whether the location data received from the first electronic device (e.g., the cellular phone 404 in FIG. 4) represents a new location by comparing the location data received from the first electronic device in block 804 against historic location data, i.e., location data received from the user during one or more previous sessions. In some embodiments, the sound-based location verification engine may access one or more databases (e.g., database(s) 1020 in FIG. 10) to obtain the historic location data.

In response to determining in block 806 the location data received from the first electronic device in block 804 represents a new location, the method 800 then continues by sending a confirm identity request to the first electronic device requesting identifying information using one or more methodologies, wherein the one or more methodologies includes a location verification option that comprises sending a location verification request from the first electronic device (block 808). For example, at block 808, the sound-based location verification engine (e.g., the sound-based location verification engine 402 in FIG. 4) may send a confirm identity request to the first electronic device (e.g., the cellular phone 404 in FIG. 4) that presents one or more methodologies from which the user of the first electronic device may select. One methodology the user of the first electronic device may select, in accordance with some embodiments, is to verify the user is at a particular location (i.e., the unverified location of the first electronic device represented by the location data received from the first electronic device in block 804).

In some embodiments, in response to the user selecting the location verification option, a location verification request may be sent from the first electronic device (e.g., the cellular phone 404 in FIG. 4) to the sound-based location verification engine (e.g., the sound based location verification engine 402 in FIG. 4) over a network (e.g., the network 408 in FIG. 4).

Then, the method 800 continues by receiving the location verification request from the first electronic device (block 810). For example, the sound-based location verification engine (e.g., the sound based location verification engine 402 in FIG. 4) may receive the location verification request from the first electronic device (e.g., the cellular phone 404 in FIG. 4) over a network (e.g., the network 408 in FIG. 4). In response to receiving the location verification request from the first electronic device, at block 810, one or more recorder scheduler module(s) (e.g., the recorder scheduler module(s) 418 in FIG. 4) of the sound-based location verification engine may schedule the first electronic device to record a sound clip at a specific time (e.g., in 5 seconds, exemplified by 11:36:15 am). Also, at block 810, the one or more recorder scheduler module(s) of the sound-based location verification engine may schedule a second electronic device (e.g., the cellular phone 406 and/or the public microphone device 430 in FIG. 4) located near the unverified location of the first electronic device/user (i.e., airport x, gate 3) to record at that same specific time (e.g., the exemplary time of 11:36:15 am) at airport x, gate 3. For example, the recorder scheduler module(s) may search one or more databases (e.g., the one or more databases 1020 in FIG. 10) to identify one or more co-located electronic device(s) as being located near the unverified location of the of the first electronic device/user (i.e., airport x, gate 3) and designate one of the co-located electronic device(s) as the second electronic device. In some embodiments, the second electronic device may be a cellular phone (e.g., the cellular phone 406 in FIG. 4), an electronic device that controls a public microphone in a public place (e.g., the public microphone device 430 in FIG. 4), or some other electronic device. For example, a public microphone may be controlled by the second electronic device, such as a security system that monitors audio-visual (AV) at the airport x.

The method 800 then continues by sending a record request both to the first electronic device and a second electronic device located near the unverified location of the first electronic device to record sound at a predetermined time (block 812). For example, at block 812, the sound-based location verification engine (e.g., the sound-based location verification engine 402 in FIG. 4) may send a record request both to the first electronic device (e.g., the cellular phone 404 in FIG. 4) and a second electronic device (e.g., the cellular phone 406 in FIG. 4) over a network (e.g., the network 408 in FIG. 4), wherein the second electronic device is located near the unverified location of the first electronic device. The record request may, for example, ask the respective users of the first and second electronic devices to enable their respective microphones (e.g., the microphones 424 and 426 in FIG. 4) at the predetermined time for x seconds.

In some embodiments, upon receiving the record request, the respective users of the first and second electronic devices begin recording and wait for the time period to pass, then a loading window may appear on the respective displays of the first and second electronic devices, followed by windows indicating the audio data is being sent and then verified.

The method 800 continues by receiving audio data generated by the first electronic device based on sound detected by a sensor of the first electronic device during the predetermined time (block 814). For example, at block 814, audio data generated by the first electronic device (e.g., the cellular phone 404 in FIG. 4) based on sound detected by a sensor (e.g., the microphone 424 in FIG. 4) of the first electronic device during the predetermined time (e.g., the exemplary time of 11:36:15 am) may be received by a sound-based location verification engine (e.g., the sound-based location verification engine 402 in FIG. 4) over a network (e.g., the network 408 in FIG. 4). Block 814 within the method 800 in FIGS. 8A-8B may correspond to block 504 within the method 500 in FIG. 5.

Also, the method 800 continues by receiving audio data generated by the second electronic device located near the unverified location of the first electronic device based on trusted sound detected by a sensor of the second electronic device during the predetermined time, wherein the trusted sound includes one or more frequencies inaudible to humans (block 816). For example, at block 816, audio data generated by the second electronic device (e.g., the cellular phone 406 in FIG. 4) located near the unverified location of the first electronic device (e.g., the cellular phone 404 in FIG. 4) based on trusted sound detected by a sensor (e.g., the microphone 426 in FIG. 4) of the second electronic device during the predetermined time (e.g., the exemplary time of 11:36:15 am) may be received by a sound-based location verification engine (e.g., the sound-based location verification engine 402 in FIG. 4) over a network (e.g., the network 408 in FIG. 4). Block 816 within the method 800 in FIGS. 8A-8B may correspond to block 506 within the method 500 in FIG. 5.

The method 800 then continues by analyzing the audio data generated by the first electronic device and the audio data generated by the second electronic device (block 818). For example, at block 818, one or more sound comparison modules (e.g., the sound comparison module(s) 422 in FIG. 4) of the sound-based location verification engine may determine notes (frequency) and timing of those notes within the audio data received from the first electronic device (e.g., the cellular phone 404 in FIG. 4) and determine notes (frequency) and timing of those notes within the audio data received from the second electronic device (e.g., the cellular phone 406 in FIG. 4). Block 818 within the method 800 in FIGS. 8A-8B may correspond to block 508 within the method 500 in FIG. 5.

The method 800 continues by generating a similarity score representing a similarity between the audio data generated by the first electronic device and the audio data generated by the second electronic device based on the analyzing operation performed in block 818 (block 820). For example, at block 820, one or more sound comparison modules (e.g., the sound comparison module(s) 422 in FIG. 4) of the sound-based location verification engine may generate the similarity score by comparing notes (frequency) and timing of those notes within the audio data received from the respective electronic devices (e.g., the respective cellular phones 404, 406 in FIG. 4). Block 820 within the method 800 in FIGS. 8A-8B may correspond to block 510 within the method 500 in FIG. 5.

The method 800 then continues by verifying the unverified location of the first electronic device based on the similarity score generated in block 820 (block 822). For example, at block 822, one or more sound comparison modules (e.g., the sound comparison module(s) 422 in FIG. 4) of the sound-based location verification engine may determine whether the similarity score is equal to or exceeds a threshold similarity score, and generate a "location valid" signal in response to determining the similarity score is equal to or exceeds the threshold similarity score. On the other hand, at block 822, in response to determining the similarity score is less than the threshold similarity score, the one or more sound comparison modules may generate a "location not valid" signal. In cases where the "location not valid" signal is generated, the one or more sound comparison modules may send a "denied" status signal to the first electronic device (i.e., the cellular phone 404 in FIG. 4) as feedback to indicate failure to verify. Also, in cases where the "location not valid" signal is generated, the user of the first electronic device may be requested to make another recording. Block 822 within the method 800 in FIGS. 8A-8B may correspond to block 512 within the method 500 in FIG. 5.

Figure 9A:
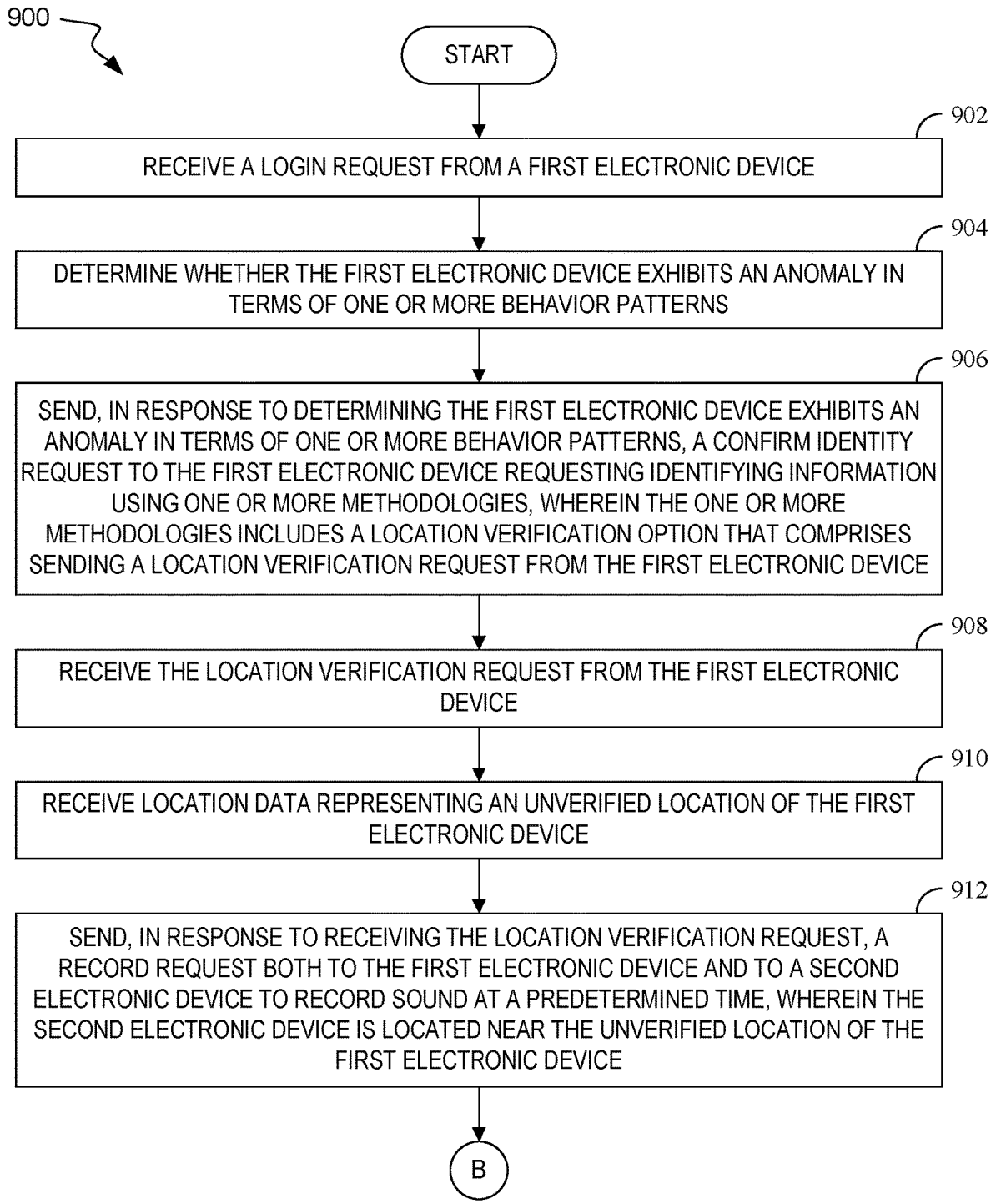
FIGS. 9A-9B depict a flow diagram of an illustrative method of verifying location using sound within the context of a login application in response to determining an electronic device from which a login request is received exhibits an anomaly in terms of one or more user behavior patterns, according to one or more embodiments.
Figure 9B:
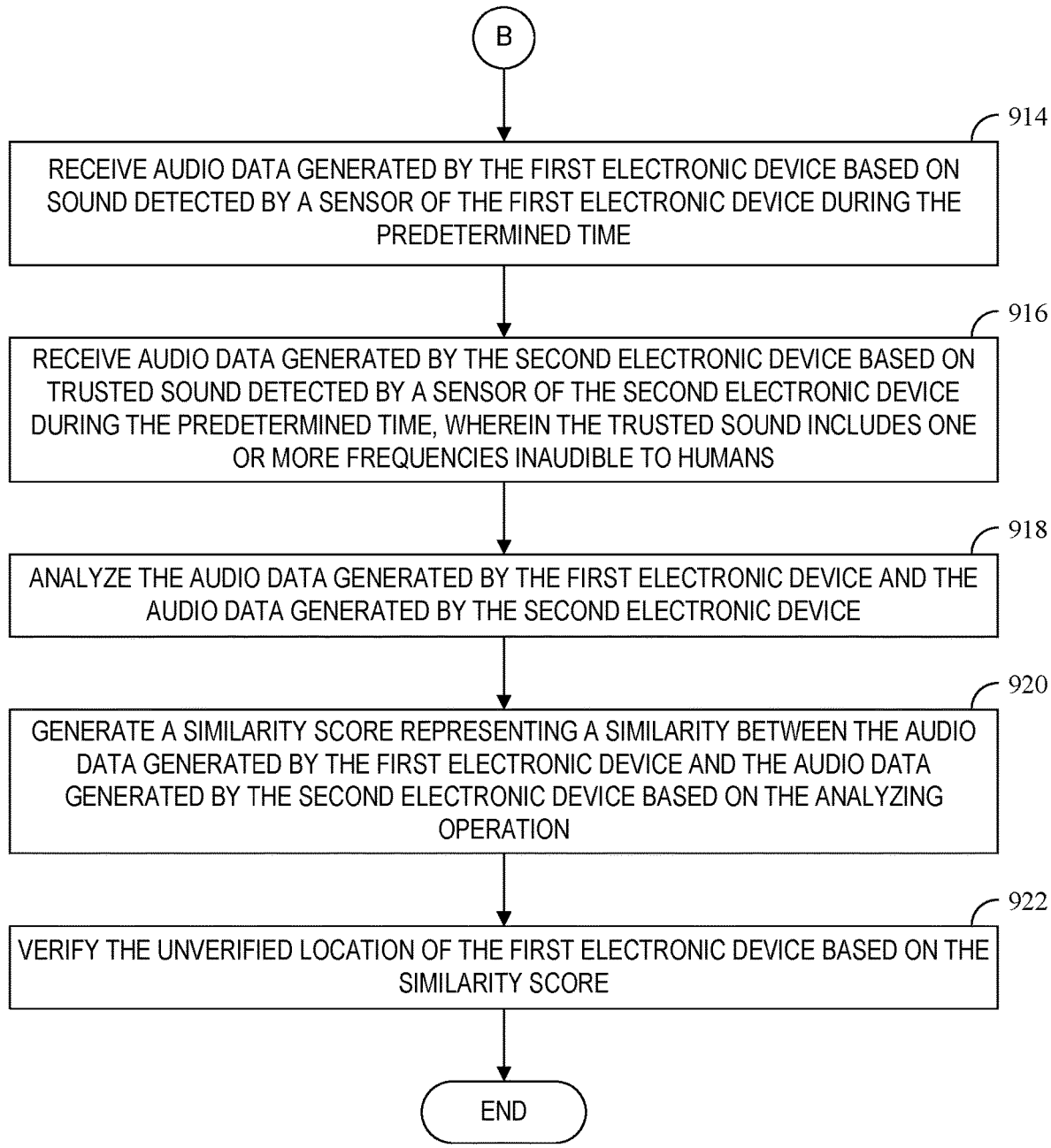

Referring now to FIGS. 9A-9B, a flow diagram of an illustrative method 900 of verifying location using sound is depicted within the context of a login application in response to determining an electronic device from which a login request is received exhibits an anomaly in terms of one or more user behavior patterns, in accordance with one or more embodiments. The method 900 sets forth the preferred order of the blocks. It must be understood, however, that the various blocks may occur at any time relative to one another.

The method 900 begins by receiving a login request from a first electronic device (block 902). For example, at block 902, the login request from the first electronic device (e.g., the cellular phone 404 in FIG. 4) may be received by a sound-based location verification engine (e.g., the sound-based location verification engine 402 in FIG. 4) over a network (e.g., the network 408 in FIG. 4). In some embodiments, the first electronic device may send the login request to the sound-based location verification engine in response to a user trying to log into a cloud-based system by entering credentials (e.g., UserID and Password fields) into a login dialog box (e.g., the login dialog box 434 in FIG. 4) displayed on the first electronic device.

The method 900 continues by determining whether the first electronic device exhibits an anomaly in terms of one or more user behavior patterns (block 904). An illustrative, non-limiting example of an anomaly in terms of one or more user behavior patterns is the first electronic device having not heretofore been used by the user to log into the cloud-based system. In some embodiments, at block 904, the sound-based location verification engine (e.g., the sound-based location verification engine 402 in FIG. 4) may determine whether the first electronic device (e.g., the cellular phone 404 in FIG. 4) exhibits an anomaly in terms of one or more user behavior patterns by analyzing information (e.g., device identification data) contained in the login request received from the first electronic device. For example, at block 904, the sound-based location verification engine may compare the device identification data contained in the login request received from the first electronic device against historic login data, i.e., login data received from the user during one or more previous sessions. In some embodiments, the sound-based location verification engine may access one or more databases (e.g., database(s) 1020 in FIG. 10) to obtain the historic login data.

In response to determining in block 904 that the first electronic device exhibits an anomaly in terms of one or more user behavior patterns, the method 900 then continues by sending a confirm identity request to the first electronic device requesting identifying information using one or more methodologies, wherein the one or more methodologies includes a location verification option that comprises sending a location verification request from the first electronic device (block 906). For example, at block 906, the sound-based location verification engine (e.g., the sound-based location verification engine 402 in FIG. 4) may send a confirm identity request to the first electronic device (e.g., the cellular phone 404 in FIG. 4) that presents one or more methodologies from which the user of the first electronic device may select. One methodology the user of the first electronic device may select, in accordance with some embodiments, is to verify the user is at a particular location.

In some embodiments, in response to the user selecting the location verification option, a location verification request may be sent from the first electronic device (e.g., the cellular phone 404 in FIG. 4) to the sound-based location verification engine (e.g., the sound based location verification engine 402 in FIG. 4) over a network (e.g., the network 408 in FIG. 4).

Then, the method 900 continues by receiving the location verification request from the first electronic device (block 908). For example, the sound-based location verification engine (e.g., the sound based location verification engine 402 in FIG. 4) may receive the location verification request from the first electronic device (e.g., the cellular phone 404 in FIG. 4) over a network (e.g., the network 408 in FIG. 4). In some embodiments, in response to the sound-based location verification engine having received the location verification request, at block 908, the user may be requested to provide her/his location (i.e., the unverified location of the first electronic device) and/or authorize transmission of her/his location to the sound-based location verification engine. The unverified location of the first electronic device, in accordance with some of the embodiments of the present invention, may or may not be spoofed. In some embodiments, the unverified location of the first electronic device may be GPS-based. For example, the unverified location of the first electronic device may be generated using a GPS (e.g., the GPS 1046 in FIG. 10) of the first electronic device. In some embodiments, the unverified location of the first electronic device may be input by the user of the first electronic device. For example, the user may input the unverified location of the first electronic device by interacting with a user input device (e.g., the user input device 1044 in FIG. 10) of the first electronic device, a touch screen (e.g., the display 1042 in FIG. 10) of the first electronic device, and/or a microphone (e.g., the microphone 1048 in FIG. 10) of the first electronic device. The user may, for example, state or type, "I'm at train station x on platform 3 now." Natural language processing (NLP) may be employed to determine the location data based on such speech or text.

The method 900 continues by receiving location data representing an unverified location of the first electronic device (block 910). For example, at block 910, the location data from the first electronic device (e.g., the cellular phone 404 in FIG. 4) may be received by a sound-based location verification engine (e.g., the sound-based location verification engine 402 in FIG. 4) over a network (e.g., the network 408 in FIG. 4). In response to receiving the location data from the first electronic device, at block 910, one or more recorder scheduler module(s) (e.g., the recorder scheduler module(s) 418 in FIG. 4) of the sound-based location verification engine may schedule the first electronic device to record a sound clip at a specific time (e.g., in 5 seconds, exemplified by 11:36:15 am). Also, at block 910, the one or more recorder scheduler module(s) of the sound-based location verification engine may schedule a second electronic device (e.g., the cellular phone 406 and/or the public microphone device 430 in FIG. 4) located near the unverified location of the first electronic device/user (i.e., airport x, gate 3) to record at that same specific time (e.g., the exemplary time of 11:36:15 am) at airport x, gate 3. For example, the recorder scheduler module(s) may search one or more databases (e.g., the one or more databases 1020 in FIG. 10) to identify one or more co-located electronic device(s) as being located near the unverified location of the of the first electronic device/user (i.e., airport x, gate 3) and designate one of the co-located electronic device(s) as the second electronic device. In some embodiments, the second electronic device may be a cellular phone (e.g., the cellular phone 406 in FIG. 4), an electronic device that controls a public microphone in a public place (e.g., the public microphone device 430 in FIG. 4), or some other electronic device. For example, a public microphone may be controlled by the second electronic device, such as a security system that monitors audio-visual (AV) at the airport x The method 900 then continues by sending a record request both to the first electronic device and a second electronic device located near the unverified location of the first electronic device to record sound at a predetermined time (block 912). For example, at block 912, the sound-based location verification engine (e.g., the sound-based location verification engine 402 in FIG. 4) may send a record request both to the first electronic device (e.g., the cellular phone 404 in FIG. 4) and a second electronic device (e.g., the cellular phone 406 in FIG. 4) over a network (e.g., the network 408 in FIG. 4), wherein the second electronic device is located near the unverified location of the first electronic device. The record request may, for example, ask the respective users of the first and second electronic devices to enable their respective microphones (e.g., the microphones 424 and 426 in FIG. 4) at the predetermined time for x seconds.

In some embodiments, upon receiving the record request, the respective users of the first and second electronic devices begin recording and wait for the time period to pass, then a loading window may appear on the respective displays of the first and second electronic devices, followed by windows indicating the audio data is being sent and then verified.

The method 900 continues by receiving audio data generated by the first electronic device based on sound detected by a sensor of the first electronic device during the predetermined time (block 914). For example, at block 914, audio data generated by the first electronic device (e.g., the cellular phone 404 in FIG. 4) based on sound detected by a sensor (e.g., the microphone 424 in FIG. 4) of the first electronic device during the predetermined time (e.g., the exemplary time of 11:36:15 am) may be received by a sound-based location verification engine (e.g., the sound-based location verification engine 402 in FIG. 4) over a network (e.g., the network 408 in FIG. 4). Block 914 within the method 900 in FIGS. 9A-9B may correspond to block 504 within the method 500 in FIG. 5.

Also, the method 900 continues by receiving audio data generated by the second electronic device located near the unverified location of the first electronic device based on trusted sound detected by a sensor of the second electronic device during the predetermined time, wherein the trusted sound includes one or more frequencies inaudible to humans (block 916). For example, at block 916, audio data generated by the second electronic device (e.g., the cellular phone 406 in FIG. 4) located near the unverified location of the first electronic device (e.g., the cellular phone 404 in FIG. 4) based on trusted sound detected by a sensor (e.g., the microphone 426 in FIG. 4) of the second electronic device during the predetermined time (e.g., the exemplary time of 11:36:15 am) may be received by a sound-based location verification engine (e.g., the sound-based location verification engine 402 in FIG. 4) over a network (e.g., the network 408 in FIG. 4). Block 916 within the method 900 in FIGS. 9A-9B may correspond to block 506 within the method 500 in FIG. 5.

The method 900 then continues by analyzing the audio data generated by the first electronic device and the audio data generated by the second electronic device (block 918). For example, at block 918, one or more sound comparison modules (e.g., the sound comparison module(s) 422 in FIG. 4) of the sound-based location verification engine may determine notes (frequency) and timing of those notes within the audio data received from the first electronic device (e.g., the cellular phone 404 in FIG. 4) and determine notes (frequency) and timing of those notes within the audio data received from the second electronic device (e.g., the cellular phone 406 in FIG. 4). Block 918 within the method 900 in FIGS. 9A-9B may correspond to block 508 within the method 500 in FIG. 5.

The method 900 continues by generating a similarity score representing a similarity between the audio data generated by the first electronic device and the audio data generated by the second electronic device based on the analyzing operation performed in block 918 (block 920). For example, at block 920, one or more sound comparison modules (e.g., the sound comparison module(s) 422 in FIG. 4) of the sound-based location verification engine may generate the similarity score by comparing notes (frequency) and timing of those notes within the audio data received from the respective electronic devices (e.g., the respective cellular phones 404, 406 in FIG. 4). Block 920 within the method 900 in FIGS. 9A-9B may correspond to block 510 within the method 500 in FIG. 5.

The method 900 then continues by verifying the unverified location of the first electronic device based on the similarity score generated in block 920 (block 922). For example, at block 922, one or more sound comparison modules (e.g., the sound comparison module(s) 422 in FIG. 4) of the sound-based location verification engine may determine whether the similarity score is equal to or exceeds a threshold similarity score, and generate a "location valid" signal in response to determining the similarity score is equal to or exceeds the threshold similarity score. On the other hand, at block 922, in response to determining the similarity score is less than the threshold similarity score, the one or more sound comparison modules may generate a "location not valid" signal. In cases where the "location not valid" signal is generated, the one or more sound comparison modules may send a "denied" status signal to the first electronic device (i.e., the cellular phone 404 in FIG. 4) as feedback to indicate failure to verify. Also, in cases where the "location not valid" signal is generated, the user of the first electronic device may be requested to make another recording. Block 922 within the method 900 in FIGS. 9A-9B may correspond to block 512 within the method 500 in FIG. 5.

Figure 10:
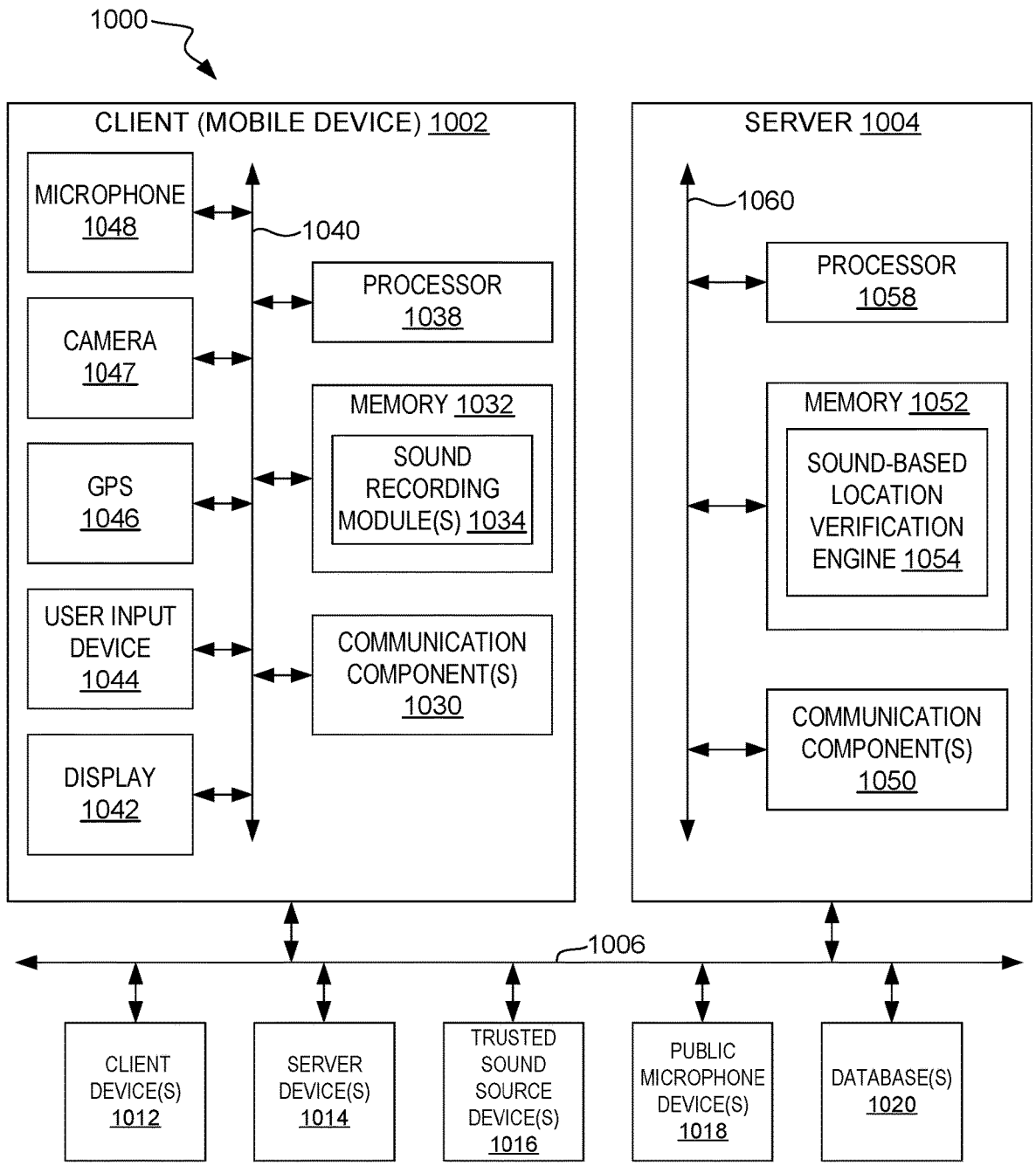
FIG. 10 depicts a block diagram of an example, non-limiting system that facilitates location verification using sound, according to one or more embodiments.

Referring now to FIG. 10, a block diagram of an example, non-limiting system 1000 is depicted that facilitates location verification using sound, in accordance with one or more embodiments. Repetitive description of like elements employed in other embodiments described herein is omitted for the sake of brevity. Aspects of systems (e.g., system 1000 and the like), apparatuses, or processes explained in this disclosure may constitute machine-executable program module(s) embodied within machine(s), e.g., embodied in one or more computer readable mediums (or media) associated with one or more machines. Such program module(s), when executed by the one or more machines, e.g., one or more computers, one or more computing devices, one or more virtual machines, etc., may cause the one or more machines to perform the operations described.

As shown in FIG. 10, the system 1000 may include one or more client systems (e.g., mobile devices) 1002, 1012, one or more server systems 1004, 1014, one or more networks 1006, one or more trusted sound devices 1016, one or more public microphone devices 1018, and one or more databases 1020. It is to be appreciated that the one or more client systems 1002, 1012, the one or more server systems 1004, 1014, the one or more trusted sound devices 1016, the one or more public microphone devices 1018, and the one or more databases 1020 may be equipped with communication devices (e.g., one or more communication components 1030, described below, with respect to the client system 1002) that enable communication between the one or more client systems 1002, 1012, the one or more server systems 1004, 1014, the one or more trusted sound devices 1016, the one or more public microphone devices 1018, and the one or more databases 1020 over the one or more networks 1006.

Client systems 1002, 1012 may include the functionality described herein with respect to requesting sound-based location verification and providing audio data for location verification. One or more client systems 1002, 1012 may be used to send sound-based location verification requests to the one or more server systems 1004, 1014 and to record and send sound clips to the one or more server systems 1004, 1014. For example, requests for sound-based location verification may originate from users of the one or more client systems 1002, 1012 attempting to log into the system 1000 or some other system. Client system 1012 may be a different type of client system than client system 1002. Client system 1012 may also be a client system 1002 and/or include one or more components of client system 1002. It is to be appreciated that in discussions below where more than one client system is employed, the client system may include one or more client systems 1002 and/or one or more client systems 1012.

Client systems 1002, 1012 may include, for example, one or more mobile phones (e.g., the cellular phones 404, 406 in FIG. 4), tablets, PDAs, laptops, or other mobile devices.

Server systems 1004, 1014 may include the functionality described herein with respect to verifying location based on sound. In some embodiments, server systems 1004, 1014 may be authentication servers. Server system 1014 may be a different type of client system than server system 1004. Server system 1014 may also be a server system 1004 and/or include one or more components of server system 1004. It is to be appreciated that in discussions below where more than one server system is employed, the server systems may include one or more server systems 1004 and/or one or more server systems 1014.

The various components (e.g., client systems 1002, 1012, server systems 1004, 1014, trusted sound source devices 1016, public microphone devices 1018, databases 1020, communication components 1030, 1050, memory 1032, 1052, processor 1038, 1058, display 1042, keyboard 1044, GPS 1046, camera 1047, microphone 1048, and/or other components) of system 1000 may be connected directly or via one or more networks 1006. Such networks 1006 may include wired and wireless networks, including, but not limited to, a cellular network, a wide area network (WAN) (e.g., the Internet), and/or a local area network (LAN), non-limiting examples of which include cellular, WAN, wireless fidelity (Wi-Fi), Wi-Max, WLAN, radio communication, microwave communication, satellite communication, optical communication, sonic communication, electromagnetic induction communication, quantum communication, and/or any other suitable communication technology.

Client system 1002 may include one or more communication components 1030 that enable client system 1002 to communicate with one or more server systems 1004, 1014, one or more other client devices 1012, one or more trusted sound source devices 1016, one or more public microphone devices 1018, and/or one or more databases 1020 over one or more networks 1006 via wireless and/or wired communications. For example, the one or more communication components 1030 may correspond to network adapter 20 in FIG. 1.

Client system 1002 may include or otherwise be associated with at least one memory 1032 that may store computer executable program module(s) (e.g., computer executable program module(s) may include, but are not limited to, sound recording module(s) 1034 and associated program module(s)). Sound recording module(s) 1034 may correspond to program modules 42 in FIG. 1. Client system 1002 may also include or otherwise be associated with at least one processor 1038 that executes the computer executable program module(s) stored in the memory 1032. Client system 1002 may further include a system bus 1040 that may couple the various components including, but not limited to, communication component(s) 1030, memory 1032, processor 1038, display 1042, user input device 1044, GPS 1046, camera, 1047, microphone 1048, and/or other components (e.g., accelerometer, gyroscope, magnetometer).

While the client system 1002 is shown in FIG. 10 as including sound recording module(s) 1034, in other embodiments, any number of different types of devices may be associated with or include at least some of the sound recording module(s) 1034. For example, one or more server systems 1004, 1014 may include at least some of the sound recording module(s) 1034. In other words, data processing associated with requesting sound-based location verification and providing audio data for location verification may be performed locally (e.g., using the processor 1038) and/or remotely (e.g., at server system 1004 using processor 1058). All such embodiments are envisaged.

Client system 1002 may also include or otherwise be associated with at least one display 1042 that may display a login dialog box (e.g., the login dialog box 434 in FIG. 4), as well as information related to using the sound recording module(s) 1034. The display 1042 may be any suitable display device. For example, the display 1042 may be a display that is integrated into a mobile phone, tablet, PDA, or laptop. In other embodiments, the display 1042 may be a component of a device communicatively coupled to a mobile phone, tablet, PDA, or laptop. In some embodiments, the display 1042 may be a touch screen that allows a user to interact with the client system 1002 using her/his finger or stylus.

Client system 1002 may also include or otherwise be associated with at least one user input device 1044, such as a keyboard and/or a pointing device (e.g., a graphics tablet, mouse, stylus, pointing stick, trackball, etc.), by which a user may provide input data (e.g., login credentials, location data representing the unverified location of the client system 1002, etc.). The user input device 1044 may be any suitable user input device. For example, the user input device 1044 may be a keyboard and/or a pointing device integrated into a mobile phone, tablet, PDA, or laptop. In other embodiments, the user input device 1044 may be a component of a device communicatively coupled to a mobile phone, tablet, PDA, or laptop.

Client system 1002 may also include or otherwise be associated with at least one GPS 1046 that may provide geolocation data (e.g., geolocation data defining the unverified location of the client system 1002). The GPS 1046 may be any suitable global satellite-based geolocation system, such as the Global Positioning System (GPS), GLObal Navigation Satellite System (GLONASS), Galileo, Quasi-Zenith Satellite System (QZSS), etc. For example, the GPS 1046 may be a global satellite-based geolocation system that is integrated into a mobile phone, tablet, PDA, or laptop. In other embodiments, the GPS 1046 may be a component of a device communicatively coupled to a mobile phone, tablet, PDA, or laptop.

Client system 1002 may also include or otherwise be associated with at least one camera 1047 that may capture an image. The camera 1047 may be any suitable image capture device. For example, the camera 1047 may be a camera that is integrated into a mobile phone, tablet, PDA, or laptop. In other embodiments, the camera 1047 may be a component of a device communicatively coupled to a mobile phone, tablet, PDA, or laptop.

Client system 1002 may also include or otherwise be associated with at least one microphone 1048 that may capture sound. The microphone 1048 may be any suitable sound capture device. For example, the microphone 1048 may be a microphone that is integrated into a mobile phone, tablet, PDA, or laptop. In other embodiments, the microphone 1048 may be a component of a device communicatively coupled to a mobile phone, tablet, PDA, or laptop.

Server device 1004 may include one or more communication components 1050 that enable server device 1004 to communicate with one or more client systems 1002, 1012, one or more other server devices 1014, one or more trusted sound source devices 1016, one or more public microphone devices 1018, and/or one or more databases 1020 over one or more networks 1006 via wireless and/or wired communications. For example, the one or more communication components 1050 may correspond to network adapter 20 in FIG. 1.

Server system 1004 may include or otherwise be associated with at least one memory 1052 that may store computer executable program module(s) (e.g., computer executable program module(s) may include, but are not limited to, sound-based location verification engine 1054 and associated program module(s)). Sound-based location verification engine 1054 may correspond to the program modules 42 in FIG. 1. Sound-based location verification engine 1054 may also correspond to the sound-based location verification engine 402 in FIG. 4. Server system 1004 may also include or otherwise be associated with at least one processor 1058 that executes the computer executable program module(s) stored in the memory 1052. Server system 1004 may further include a system bus 1060 that may couple the various components including, but not limited to, communication component(s) 1050, memory 1052, processor 1058, and/or other components.

While the server system 1004 is shown in FIG. 10 as including the sound-based location verification engine 1054, in other embodiments, any number of different types of devices may be associated with or include all or some of the sound-based location verification engine 1054. For example, one or more client systems 1002, 1012 may include at least some of the sound-based location verification engine 1054. In other words, data processing associated with the sound-based location verification engine 1054 may be performed locally (e.g., using the processor 1058) and/or remotely (e.g., at client system 1002 using processor 1038). All such embodiments are envisaged.

The one or more trusted sound source devices 1016 may be any suitable sound source capable of being activated to produce the trusted sound near the unverified location of the client system 1002, 1012. For example, the trusted sound source device(s) 1016 may activate a public address (PA) loudspeaker (e.g., the PA loudspeaker 412 in FIG. 4) or other sound source to produce the trusted sound (e.g., including one or more frequencies inaudible to humans—i.e., below 20 Hz and/or above 20.00 Hz). In some embodiments, the trusted sound source device(s) 1016 may activate the PA loudspeaker to play sound that includes a series of chirps outside the frequency range audible to humans. The one or more trusted sound source devices 1016 may correspond to the trusted sound source 410 in FIG. 4. In some embodiments, the one or more trusted sound source devices 1016 may also be a client system 1002, 1012 and/or include one or more components of client system 1002, 1012.

The one or more public microphone devices 1018 may be any suitable electronic device capable of controlling a public microphone (e.g., the public microphone 432 in FIG. 4) in a public place near the unverified location of the client system 1002, 1012. For example, the public microphone device 1018 may be a security system that monitors audio-visual (AV) at a public place, such as an airport, train station, etc. The one or more public microphone devices 1018 may correspond to the public microphone device 430 in FIG. 4. In some embodiments, the one or more public microphone devices 1018 may also be a client system 1002, 1012 and/or include one or more components of client system 1002, 1012.

The one or more databases 1020 may be any database, non-limiting examples of which include one or more databases that store current location data (e.g., the real time location of the one or more client systems 1002, 1012, the real time location of the one or more trusted sound source devices 1016, the real time location of the one or more public microphone devices 1018), historical location data (e.g., location data received from each of a plurality of users during one or more previous sessions), historical login data (e.g., login data received from each of a plurality of users during one or more previous sessions), and the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In one or more embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects are described herein with reference to flowchart illustrations and/or block diagrams of methods, apparatus (systems), and computer program products according to one or more embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One skilled in the art will appreciate that many variations are possible within the scope of the present invention. For example, the particular hardware and software implementation details described herein are merely for illustrative purposes and are not meant to limit the scope of the described subject matter. Thus, while the present invention has been particularly shown and described with reference to preferred embodiments thereof, it will be understood by those skilled in the art that changes in form and details may be made therein without departing from the spirit and scope of the present invention.

What is claimed is:

1. A computer-implemented method of verifying location using sound, the method comprising:
   receiving, at a server device, location data representing an unverified location of a first electronic device;
   receiving, at the server device, audio data generated by the first electronic device based on sound detected by a sensor of the first electronic device during a predetermined time;
   receiving, at the server device, audio data generated by a second electronic device located near the unverified location of the first electronic device based on trusted sound detected by a sensor of the second electronic device during the predetermined time, wherein the trusted sound includes one or more frequencies inaudible to humans;
   analyzing, at the server device, the audio data generated by the first electronic device and the audio data generated by the second electronic device;
   generating, at the server device, a similarity score representing a similarity between the audio data generated by the first electronic device and the audio data generated by the second electronic device based on the analyzing operation;
   verifying, at the server device, the unverified location of the first electronic device based on the similarity score.

2. The method as recited in claim 1, further comprising:
   activating, during the predetermined time, a transducer located near the unverified location of the first electronic device to produce the trusted sound.

3. The method as recited in claim 2, wherein the trusted sound includes infrasonic sound below 20 Hz and/or ultrasonic sound above 20,000 Hz.

4. The method as recited in claim 1, further comprising:
   activating, during the predetermined time and over a predefined interval, one or more trusted sound source devices located near the unverified location of the first electronic device to produce the trusted sound including sound at different short intervals within the predefined interval respectively at different frequency bands.

5. The method as recited in claim 1, wherein the first electronic device is a mobile device.

6. The method as recited in claim 1, wherein the second electronic device is a mobile device.

7. The method as recited in claim 1, wherein the server device is an authentication server.

8. The method as recited in claim 1, wherein analyzing, at the server device, the audio data generated by the first electronic device and the audio data generated by the second electronic device includes:
   generating, at the server device, one or more first audio fingerprints based on the audio data generated by the first electronic device;
   generating, at the server device, one or more second audio fingerprints based on the audio data generated by the second electronic device;

comparing, at the server device, the one or more first audio fingerprints and the one or more second audio fingerprints.

9. The method as recited in claim 8, wherein generating, at the server device, a similarity score representing a similarity between the audio data generated by the first electronic device and the audio data generated by the second electronic device based on the analysis operation includes generating the similarity score based on the comparing operation.

10. The method as recited in claim 9, wherein verifying, at the server device, the unverified location of the first electronic device based on the similarity score includes:
determining whether the similarity score is equal to or exceeds a threshold similarity score;
generating a "location valid" signal in response to determining the similarity score is equal to or exceeds the threshold similarity score.

11. The method as recited in claim 1, further comprising:
receiving, at the server device, a login request from the first electronic device;
determining, at the server device, whether the location data received from the first electronic device represents a new location;
sending, from the server device, in response to determining the location data received from the first electronic device represents a new location, a confirm identity request to the first electronic device requesting identifying information using one or more methodologies, wherein the one or more methodologies include a location verification option that comprises sending a location verification request from the first electronic device;
receiving, at the server device, the location verification request from the first electronic device;
sending, from the server device, in response to receiving the location verification request, a record request both to the first electronic device and to the second electronic device to record sound at the predetermined time.

12. The method as recited in claim 1, further comprising:
receiving, at the server device, a login request from the first electronic device;
determining, at the server device, whether the first electronic device exhibits an anomaly in terms of one or more user behavior patterns;
sending, from the server device, in response to determining the first electronic device exhibits an anomaly in terms of one or more user behavior patterns, a confirm identity request to the first electronic device requesting identifying information using one or more methodologies, wherein the one or more methodologies include a location verification option that comprises sending a location verification request from the first electronic device;
receiving, at the server device, the location verification request from the first electronic device;
sending, from the server device, in response to receiving the location verification request, a record request both to the first electronic device and to the second electronic device to record sound at the predetermined time.

13. A system for verifying location using sound, comprising:
a server device, wherein the server device comprises one or more processors, one or more computer readable storage devices, and program instructions stored on at least one of the one or more computer readable storage devices for execution by at least one of the one or more processors, the program instructions executable to:
receive, at the server device, location data representing an unverified location of a first electronic device;
receive, at the server device, audio data generated by the first electronic device based on sound detected by a sensor of the first electronic device during a predetermined time;
receive, at the server device, audio data generated by a second electronic device located near the unverified location of the first electronic device based on trusted sound detected by a sensor of the second electronic device during the predetermined time, wherein the trusted sound includes one or more frequencies inaudible to humans;
analyze, at the server device, the audio data generated by the first electronic device and the audio data generated by the second electronic device;
generate, at the server device, a similarity score representing a similarity between the audio data generated by the first electronic device and the audio data generated by the second electronic device based on the analyze operation;
verify, at the server device, the unverified location of the first electronic device based on the similarity score.

14. The system as recited in claim 13, the program instructions further executable to:
activate, during the predetermined time, a transducer located near the unverified location of the first electronic device to produce the trusted sound.

15. The system as recited in claim 14, wherein the trusted sound includes infrasonic sound below 20 Hz and/or ultrasonic sound above 20,000 Hz.

16. The system as recited in claim 13, the program instruction further executable to:
activate, during the predetermined time and over a predefined interval, one or more trusted sound source devices located near the unverified location of the first electronic device to produce the trusted sound including sound at different short intervals within the predefined interval respectively at different frequency bands.

17. The system as recited in claim 13, wherein to analyze, at the server device, the audio data generated by the first electronic device and the audio data generated by the second electronic device, the program instructions further executable to:
generate, at the server device, one or more first audio fingerprints based on the audio data generated by the first electronic device;
generate, at the server device, one or more second audio fingerprints based on the audio data generated by the second electronic device;
compare, at the server device, the one or more first audio fingerprints and the one or more second audio fingerprints.

18. The system as recited in claim 13, the program instructions further executable to:
receive, at the server device, a login request from the first electronic device;
determine, at the server device, whether the location data received from the first electronic device represents a new location and/or whether the first electronic device exhibits an anomaly in terms of one or more user behavior patterns;

send, from the server device, in response to determining the location data received from the first electronic device represents a new location and/or determining the first electronic device exhibits an anomaly in terms of one or more user behavior patterns, a confirm identity request to the first electronic device requesting identifying information using one or more methodologies, wherein the one or more methodologies include a location verification option that comprises sending a location verification request from the first electronic device;

receive, at the server device, the location verification request from the first electronic device;

send, from the server device, in response to receiving the location verification request, a record request both to the first electronic device and to the second electronic device to record sound at the predetermined time.

19. A computer program product for verifying location using sound, the computer program product comprising a computer readable storage medium having program code embodied therewith, the program code executable by one or more processors, to perform a method comprising:

receiving, at a server device, location data representing an unverified location of a first electronic device;

receiving, at the server device, audio data generated by the first electronic device based on sound detected by a sensor of the first electronic device during a predetermined time;

receiving, at the server device, audio data generated by a second electronic device located near the unverified location of the first electronic device based on trusted sound detected by a sensor of the second electronic device during the predetermined time, wherein the trusted sound includes one or more frequencies inaudible to humans;

analyzing, at the server device, the audio data generated by the first electronic device and the audio data generated by the second electronic device;

generating, at the server device, a similarity score representing a similarity between the audio data generated by the first electronic device and the audio data generated by the second electronic device based on the analyzing operation;

verifying, at the server device, the unverified location of the first electronic device based on the similarity score.

20. The computer program product as recited in claim 19, wherein analyzing, at the server device, the audio data generated by the first electronic device and the audio data generated by the second electronic device includes:

generating, at the server device, one or more first audio fingerprints based on the audio data generated by the first electronic device;

generating, at the server device, one or more second audio fingerprints based on the audio data generated by the second electronic device;

comparing, at the server device, the one or more first audio fingerprints and the one or more second audio fingerprints.

* * * * *